US012583747B2

(12) United States Patent
Stockhoff et al.

(10) Patent No.: US 12,583,747 B2
(45) Date of Patent: Mar. 24, 2026

(54) METHOD FOR PRODUCING PHOSPHORIC ACID AND CALCIUM SULPHATE QUALITY SUITABLE FOR A CLINKER PROCESS FOR THE COMMERCIAL AND INDUSTRIAL UTILIZATION OF CALCIUM SULPHATE

(71) Applicants:thyssenkrupp Industrial Solutions AG, Essen (DE); thyssenkrupp AG, Essen (DE)

(72) Inventors: Peter Stockhoff, Dorsten (DE); Stefan Helmle, Hamm (DE); Deyvi Javier Rivas Villarreal, Dortmund (DE); Nicolai Daheim, Beckum (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 831 days.

(21) Appl. No.: 17/791,687

(22) PCT Filed: Jan. 5, 2021

(86) PCT No.: PCT/EP2021/050033
§ 371 (c)(1),
(2) Date: Jul. 8, 2022

(87) PCT Pub. No.: WO2021/140074
PCT Pub. Date: Jul. 15, 2021

(65) Prior Publication Data
US 2023/0373789 A1 Nov. 23, 2023

(30) Foreign Application Priority Data
Jan. 8, 2020 (DE) ..................... 10 2020 100 241.6

(51) Int. Cl.
*C01B 25/232* (2006.01)
*C01B 17/74* (2006.01)
(Continued)

(52) U.S. Cl.
CPC ............ *C01B 25/232* (2013.01); *C01B 17/74* (2013.01); *C01B 25/234* (2013.01);
(Continued)

(58) Field of Classification Search
None
See application file for complete search history.

(56) References Cited

U.S. PATENT DOCUMENTS 2,222,740 A 11/1940 Ferdinand
2,528,103 A 10/1950 Willson
(Continued)

FOREIGN PATENT DOCUMENTS

AN 2009-S54348 6/2008
AT 284701 B 9/1970
(Continued)

OTHER PUBLICATIONS

English Translation of International Search Report issued in PCT/EP2020/085277, dated Jan. 18, 2021.
(Continued)

*Primary Examiner* — Michael Forrest
*Assistant Examiner* — Nicole Lee Quist
(74) *Attorney, Agent, or Firm* — thyssenkrupp North America, LLC

(57) ABSTRACT

A process may involve digesting raw phosphate with concentrated sulfuric acid and converting the raw phosphate to calcium sulfate in the form of dihydrate and/or hemihydrate, and phosphoric acid, separating off calcium sulfate as solid from a liquid phase of a suspension that is obtained, treating the calcium sulfate that is separated off or from a stockpile with an acid to give a suspension with purified calcium sulfate and $P_2O_5$-containing acid solution, separating off the purified calcium sulfate as solid from a liquid phase of a suspension obtained, using the $P_2O_5$-containing liquid phase
(Continued)

as a portion of the sulfuric acid required for digesting the raw phosphate or as feedstock for treating phosphogypsum from the stockpile to give a suspension of purified calcium sulfate and $P_2O_5$-containing acid solution, which is thereafter processed.

10 Claims, 9 Drawing Sheets

(51) Int. Cl.
| | |
|---|---|
| *C01B 25/234* | (2006.01) |
| *C01F 11/46* | (2006.01) |
| *C04B 11/00* | (2006.01) |

(52) U.S. Cl.
CPC .......... *C01F 11/468* (2013.01); *C04B 11/005* (2013.01); *C01P 2004/61* (2013.01); *C01P 2004/62* (2013.01); *C04B 2235/447* (2013.01)

(56) References Cited

U.S. PATENT DOCUMENTS

| | | | |
|---|---|---|---|
| 2,531,977 A | 11/1950 | Hammaren et al. | |
| 3,547,581 A | 12/1970 | Gauster | |
| 3,607,036 A | 9/1971 | Foecking | |
| 3,652,308 A * | 3/1972 | Stich | C04B 7/04 |
| | | | 106/765 |
| 3,717,489 A | 2/1973 | Herzog et al. | |
| 3,984,525 A | 10/1976 | Williams et al. | |
| 4,312,842 A * | 1/1982 | Wilson, Sr. | C04B 18/026 |
| | | | 423/322 |
| 4,362,705 A | 12/1982 | Weterings | |
| 4,387,083 A * | 6/1983 | Weterings | C09C 1/025 |
| | | | 423/320 |
| 4,388,292 A | 6/1983 | Palmer et al. | |
| 4,415,543 A | 11/1983 | Wilson, Sr. et al. | |
| 4,588,470 A | 5/1986 | Abegglen | |
| 4,588,570 A | 5/1986 | Davister et al. | |
| 4,608,238 A | 8/1986 | Wilson, Sr. et al. | |
| 4,797,265 A | 1/1989 | Inoue et al. | |
| 5,626,667 A | 5/1997 | Ohle | |
| 5,842,853 A | 12/1998 | Bohle | |
| 6,391,107 B1 | 5/2002 | Reimann et al. | |
| 6,551,428 B1 | 4/2003 | Guillou et al. | |
| 8,470,270 B2 | 6/2013 | Abramov et al. | |
| 9,631,258 B2 | 4/2017 | Genkin et al. | |
| 10,105,648 B2 | 10/2018 | Rohloff et al. | |
| 2016/0040268 A1 | 2/2016 | Genkin et al. | |
| 2019/0322540 A1 | 10/2019 | Henry et al. | |

FOREIGN PATENT DOCUMENTS

| | | | |
|---|---|---|---|
| AT | 292539 B | 4/2005 | |
| BE | 818 062 A | 1/1975 | |
| CA | 828060 A | 11/1969 | |
| CA | 886485 A | 11/1971 | |
| CA | 2852131 A1 | 5/2013 | |
| CN | 1948131 A | 4/2007 | |
| CN | 101186284 B | 5/2008 | |
| CN | 101486536 | 7/2009 | |
| CN | 102502524 | 6/2012 | |
| CN | 103466982 A | 12/2013 | |
| CN | 104005086 A * | 8/2014 | |
| CN | 105859167 A | 8/2016 | |
| CN | 101597687 A | 12/2019 | |
| DE | 19 12 183 | 10/1970 | |
| DE | 16 46 647 C3 | 8/1971 | |
| DE | 16 71 215 A1 | 9/1971 | |
| DE | 23 23 292 A1 | 11/1974 | |
| DE | 32 22 721 C2 | 12/1983 | |
| DE | 3622688 A1 | 1/1988 | |
| DE | 44 47 602 A1 | 5/1996 | |
| DE | 10118142 A1 | 10/2002 | |
| DE | 10252585 A1 | 5/2004 | |
| DE | 10344040 A1 | 4/2005 | |
| DE | 102012111217 A1 | 5/2014 | |
| DE | 102014108334 A1 | 12/2015 | |
| DE | 102017114831 A1 | 1/2019 | |
| EP | 0044120 A2 * | 7/1981 | |
| EP | 0 041 761 A1 | 12/1981 | |
| EP | 0 044 120 A1 | 1/1982 | |
| EP | 0728713 A2 | 8/1996 | |
| EP | 1037005 B1 | 9/2000 | |
| EP | 2 455 502 A2 | 5/2012 | |
| EP | 2449328 A1 | 5/2012 | |
| EP | 2 771 280 A1 | 9/2014 | |
| EP | 3 020 468 A1 | 5/2016 | |
| GB | 120991 A1 | 12/1918 | |
| GB | 1007898 A | 10/1965 | |
| GB | 1128104 A | 9/1968 | |
| IN | 215676 B | 4/2006 | |
| JP | 2007-126328 A | 5/2007 | |
| RU | 2 296 723 C2 | 1/2007 | |
| RU | 2412265 C1 | 2/2011 | |
| RU | 2471011 C1 | 12/2012 | |
| RU | 2487834 C1 | 7/2013 | |
| RU | 2510186 C1 | 3/2014 | |
| RU | 2 607 862 C1 | 1/2017 | |
| RU | 2630072 C2 | 8/2017 | |
| RU | 2708718 C1 | 12/2019 | |
| SU | 947032 A1 | 7/1982 | |
| SU | 1604730 A1 | 11/1990 | |
| WO | 2013/060689 A1 | 5/2013 | |
| WO | 2019/007838 A1 | 1/2019 | |
| WO | 2019-211196 A1 | 11/2019 | |
| WO | 2019-211202 A1 | 11/2019 | |
| WO | 2020/067856 A1 | 4/2020 | |

OTHER PUBLICATIONS

Hilton, Julian, "Phosphogypsum (PG): Uses and Current Handling Practices Worldwide", 25th Annual Lakeland FL, London UK, Regional Phosphate Conference, 53 pages (2010).

Kandil et al., "Ammonium sulfate preparation from phosphogypsum waste", Journal of Radiation Research and Applied Sciences, 10: 24-33 (2017).

Abouzeid, Abdel-Zaher M., "Physical and thermal treatment of phosphate ores—An overview", Int. J. Miner. Process, 85: 59-84 (2008).

* cited by examiner

Fig. 9

METHOD FOR PRODUCING PHOSPHORIC ACID AND CALCIUM SULPHATE QUALITY SUITABLE FOR A CLINKER PROCESS FOR THE COMMERCIAL AND INDUSTRIAL UTILIZATION OF CALCIUM SULPHATE

CROSS REFERENCE TO RELATED APPLICATIONS

This application is a U.S. National Stage Entry of International Patent Application Serial Number PCT/EP2021/050033, filed Jan. 5, 2021, which claims priority to German Patent Application No. DE 10 2020 100 241.6, filed Jan. 8, 2020, the entire contents of both of which are incorporated herein by reference.

FIELD

The present disclosure generally relates to processes for producing phosphoric acid and purified calcium sulfate that can be used for producing cement clinker and sulfuric acid and also to plants for performing such processes.

BACKGROUND

The phosphogypsum grade obtained from the phosphoric acid process is dependent on factors such as raw phosphate used and process conditions when digesting the raw phosphate with sulfuric acid. Yields achieved to date of phosphorus from the raw phosphate, by wet-chemical methods and depending on the phosphoric acid process selected, have been not more than 98.5% (see, for example, Ullmann's Encyclopedia of Industrial Chemistry, 5th edition, 1991, vol. A19, "Phosphoric Acid and Phosphate", pp. 470-473).

Calcium sulfate is a waste product of the phosphoric acid-producing industry and is obtained as dihydrate and/or hemihydrate when phosphate ores are digested with sulfuric acid. The calcium sulfate formed in the production of phosphoric acid is also referred to as phosphogypsum.

There are three forms of calcium sulfate: dihydrate (also known as gypsum), hemihydrate (also bassanite), and anhydrite. They may be obtained during phosphoric acid production processes, and are distinguished in mineralogical terms by different amounts of water of crystallization. The dihydrate possesses two, the hemihydrate one half water of crystallization, and the anhydrite crystalizes without any water of crystallization.

The reaction kinetics and the thermodynamic stability of the various forms of calcium sulfate in aqueous media have been thoroughly studied, as can be read for example in the review article by Freyer and Voigt, Monatshefte für Chemie, 134, 693-719, 2003. It is known that the dihydrate form is the stable form up to around 50° C. Beyond this, the anhydrite is the stable phase. Hemihydrate, conversely, is metastable over the entire temperature range. Starting from the gypsum, accordingly, the expectation is of a gradual conversion to the anhydrite in a temperature range between 42-60° C. (various temperature ranges are postulated in the literature) for aqueous solutions. The solubility of anhydrite falls continuously as temperatures rise. For gypsum, conversely, the solubility rises initially up to a plateau at around 50° C., and then falls slightly with rising temperature. As a result of this, in the temperature range stated above, the molar solubilities of the two forms intersect, and anhydrite, above the temperatures, and dihydrate, below them, are precipitated, being salts of low solubility. The hemihydrate has better solubility over the entire range than the two other forms.

In The American Mineralogist, vol. 52, 1967, Hardie showed that sulfuric acid, owing to its modifying effect on water activity, has a significant influence on the kinetics of the recrystallization of the gypsum to form anhydrite. A reduced water activity here lowers the equilibrium temperature between dihydrate and anhydrite and therefore favors the recrystallization to anhydrite at lower temperatures.

Kinetic studies on the recrystallization of gypsum to anhydrite and vice versa are mostly based on time-dependent determination of the mineralogy of the precipitation products. The mechanism of the recrystallization has not been definitively resolved to date.

Owing to impurities such as phosphorus, fluorine, radioactive components and heavy metals in the calcium sulfate from the existing phosphoric acid production processes, the current possibilities for using calcium sulfate, as a cement admixture, fertilizer, mortar or roadbuilding material, for example, are limited, and so only 15% of the annual worldwide production of calcium sulfate from phosphoric acid production is used accordingly. The remaining 85% of the annual production of calcium sulfate is either stockpiled or dumped at sea.

Given the current environmental situation, repositories for the deposition of the phosphogypsum, or the dumping of phosphogypsum at sea, are approved, if at all, only with relatively stringent impositions.

The raw phosphate processed can be used for phosphogypsum production via the possible phosphoric acid processes according to the following processing methods: 1. calcining, 2. flotation, 3. conversion to monocalcium phosphate or dicalcium phosphate using inorganic acids. The methods stated are known to the person skilled in the art and are described in, for example, Physical and thermal treatment of phosphate ores—An overview; Int. J. Miner. Process. 85 (2008) 59-84; Abdel-Zaher M. Abouzeid; The Fertilizer Manual 3rd Edition; published by UNIDO & IFDC, 1998 edition; ISBN: 0792350324 9780792350323; Pyroprocessing for the minerals industry; Thyssenkrupp Polysius; identifier: 1625/D (1.0 12.11 Stu).

For every metric ton of phosphoric acid produced, depending on production method, 4 to 5 tons of calcium sulfate are produced. On account of the naturally different grades/compositions of the phosphate ores and of the different process parameters for the production of phosphoric acid, the grades of calcium sulfates produced also show corresponding differences.

The elevated demands relating to the handling of the calcium sulfate or phosphogypsum produced present the phosphoric acid-producing industry with complex challenges. Estimates for the lifetime storage of phosphogypsum are as high as 25 dollars/t of gypsum for the producing enterprises.

An example of the possible commercial and industrial-scale use of calcium sulfate/phosphogypsum, mentioned many times in the literature, is the conversion of phosphogypsum to cement clinker or cement and $SO_2$ or sulfuric acid. The conversion of gypsum and phosphogypsum to cement and sulfuric acid by the Müller-Kühne process or by the OSW-Krupp process has been known for a long time—see, for example, patent specification AT 292539 B.

DE 3222721 C2, on the basis of the Müller-Kühne process, describes an improved process resulting from upstream partial dewatering of the gypsum by centrifuging, with subsequent two-stage drying, where the $SO_2$-containing offgas emerging from the first drying stage is introduced directly into the gas scrubber of the sulfuric acid plant. The process described does not make any reference to the quality of the phosphogypsum in terms of particular components, nor any reference to the quality of the $SO_2$ offgas for the downstream sulfuric acid plant indicated.

Similarly to the process of the invention, there are comparable processes in the patent literature that use an anhydrite process (Hammaren U.S. Pat. No. 2,531,977 and Weterings EP 0044120).

The patent specification U.S. Pat. No. 2,531,977 describes a process in which first a phosphorus-containing calcium salt is converted into calcium sulfate and in a second step the calcium sulfate is converted to anhydrite. According to said patent, this second conversion step requires reaction times of at least 2 hours. It is said to result in an increase in the phosphorus yield and at the same time in purification of the anhydrite. The patent specification, however, does not provide a specific indication either of the increase in yield or of the purification efficiency of the process. A disadvantage, as observed in patent EP 004120, is the fact that the process stated allows only approximately half of the calcium sulfate to be converted to anhydrite, since in accordance with said process the water budget of the phosphoric acid plant otherwise is significantly adversely affected.

EP 004120 describes an improved process relative to U.S. Pat. No. 2,531,977. In this process, in order not to disrupt the water budget of the phosphoric acid plant, the suspension of dihydrate and phosphoric acid obtained after the first step is separated, at cost and inconvenience, via several hydrocyclones into a fine fraction and a coarse fraction; liquid constituents are recovered via a thickener, in order as far as possible to prevent disruption to the water balance; and lastly the fractions are separated via a further filtration unit, before the dihydrate is supplied to the step for recrystallization to the anhydrite. The process has a number of obvious disadvantages, including (i) the need for various further process steps, such as hydrocyclones, thickeners, and an additional filtration unit, (ii) 5-15% of the dihydrate has to be discarded, (iii) the connection and operation cost and complexity of the plant is significantly increased, and it is significantly more difficult to integrate into existing plants, and (iv) significantly higher capital costs and operating costs would arise for processes described.

In Journal of Radiation Research and Applied Sciences; 10; 2017, Kandil et al. describe a process for producing ammonium sulfate from phosphogypsum, in which, in a first step, sulfuric acid is used to leach out $P_2O_5$, F, lanthanides, and further constituents. There is no association between the process described and the conversion of phosphogypsum to cement clinker and sulfuric acid.

EP 0041761 A1, in connection with the conversion of phosphogypsum to cement clinker and $SO_2$ gas, relates exclusively to the recrystallization of calcium sulfate dihydrate to calcium sulfate anhydrite. It is possible to achieve $P_2O_5$ contents of below 0.01% by weight and fluorine contents of below 0.05% by weight in the calcium sulfate anhydrite. From the anhydrite thus obtained, calcium components and sulfur dioxide can be obtained at high temperatures. The possibility of recycling spent sulfuric acid into the phosphoric acid process is mentioned, but no due consideration is given to influencing factors such as gypsum grain size and solids to liquid ratio (S/L) that directly affect the water balance in the phosphoric acid complex.

CA 886485 A relates to a process for treating dihydrate gypsum from phosphoric acid production for reducing the $P_2O_5$ content by recrystallizing the dihydrate gypsum into hemihydrate gypsum or anhydrite gypsum in acid at 50 to 150° C. and at acid concentrations of 0.5 to 60 percent by weight. The dwell time period is 0.5 to 2 hours. The gypsum obtained can be used as an admixture in the cement industry.

CN 101486536 A relates to a process for treating phosphogypsum with sulfuric acid. The primary objective is the reduction of phosphorus from the gypsum. Following treatment with sulfuric acid, the gypsum is neutralized with calcium products. The gypsum thus treated is said to be useful as a raw material for cement or as an additive.

CN 105859167 A describes a process for producing white calcium sulfate anhydrite. Starting material in the form of sieved phosphogypsum is treated with sulfuric acid and an extractant for the purpose in particular of reducing the phosphorus content.

GB 1007898 relates to a process for producing phosphoric acid on the basis of the HDH (hemihydrate-dihydrate) process. This is accomplished by establishing process parameters which are specific for the particular hydration.

GB 1128104 relates to a process for producing concentrated phosphoric acid, wherein the gypsum is obtained in the form of anhydrite with reduced levels of $P_2O_5$ and fluorine.

Singh and Garg; Production of Beneficiated Phosphogypsum for Cement Manufacture; Journal of Scientific & Industrial Research; 61; 2002, report on the purification of phosphogypsum in relation to the phosphorus and fluoride impurities, where the process combines washing of the phosphogypsum with wet sieving of the suspension to particle sizes above 300 pm. Disadvantages of this process are that P and/or F depletion is possible only to a certain degree, successful purification is critically dependent on the nature of the gypsum and the associated particle size distribution, and a relatively high fraction of the phosphogypsum is obtained as a waste material.

The approach chosen by Aliedeh; Factorial Design Study of $P_2O_5$ Reduction for Jordanian Phosphogypsum using Sulfuric and Nitric Acids Solutions; Journal of Chemical Technology and Metallurgy, 53, 2018, is that of wet-chemical leaching of the gypsum using nitric acid and/or sulfuric acid, the aim here being in particular to reduce the P content. The concentrations of the two acids used were 0.5 to 1.5 wt % for $H_2SO_4$ and 1 to 5 wt % for $HNO_3$. According to the results, there is a drastic effect on the leaching behavior by the number of washing operations, and a relatively low influence by concentration and S/L ratio. From the leaching results presented it is evident that massive quantities of washing solution are required.

The processes according to the prior art provide yields of phosphorus from the raw phosphate that are deserving of improvement. In the purification of the resultant calcium sulfate as well there is need for improvement.

The leaching efficiency refers to the percentage fraction of a substance in question that is transferred (or else extracted) from a starting phase (e.g., solid) into another phase (e.g., liquid), based on the total amount of the substance in question in the starting phase.

In the literature, generally speaking, only the respective individual processes such as phosphogypsum processing, thermal decomposition of the phosphogypsum into cement clinker and sulfur dioxide, are described. There is only occasional mention of possible associations with upstream and/or downstream processes.

A prerequisite for the use of calcium sulfate/phosphogypsum as a base material for clinker production is the compliance with the limit values or guide values for certain components in the phosphogypsum that have adverse effects on the quality of cement produced from the clinker. These components include phosphorus, fluoride, and any radioactive constituents.

Thus a need exists for a process for producing phosphoric acid and purified calcium sulfate such that the $P_2O_5$ yield is as near to maximum as possible and that the purified calcium sulfate (phosphogypsum) can be used for producing value products on the industrial scale, to meet the environmental and economic requirements. A need also exists to improve or optimize the leaching efficiency and filterability for phosphogypsum and calcium sulfate respectively.

BRIEF DESCRIPTION OF THE FIGURES

FIG. 9 is a graphic representation of a composition of mineralogy (left-hand axis) and of leaching efficiency with respect to $P_2O_5$ content (right-hand axis) against dwell time of the gypsum PG A in sulfuric acid from example 10.

DETAILED DESCRIPTION

Figure 1:
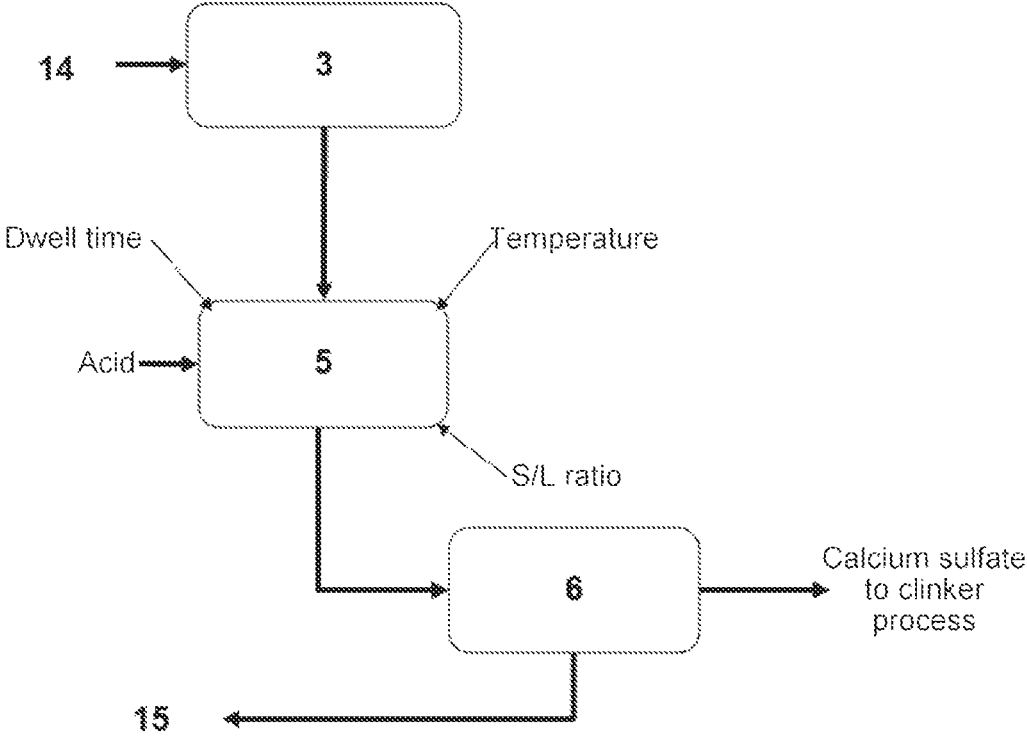
FIG. 1 is a schematic flow diagram for a workup of calcium sulfate from phosphoric acid production after a substep of one example process of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a process for producing phosphoric acid and purified calcium sulfate by reaction of raw phosphate with sulfuric acid may comprise the following steps:

a) the raw phosphate in a first step is digested with concentrated sulfuric acid and converted to calcium sulfate in the form of dihydrate, hemihydrate or a combination of hemihydrate and dihydrate, and phosphoric acid, b) the calcium sulfate is separated off as solid from the liquid phase of the suspension obtained, c) the calcium sulfate from step b), separated off from the phosphoric acid, and/or calcium sulfate/phosphogypsum from the stockpile is treated with an acid, to give a suspension with purified calcium sulfate and $P_2O_5$-containing acid solution, d) the purified calcium sulfate after step c) is separated off as solid from the liquid phase of the suspension obtained, e) e1) the $P_2O_5$-containing liquid phase obtained from step d) is used as feedstock in step a), more particularly as a portion of the sulfuric acid required for digesting the raw phosphate, and/or e2) the $P_2O_5$-containing liquid phase obtained from step d) is used as feedstock for treating phosphogypsum from the stockpile according to step c), to give a suspension of purified calcium sulfate and/or $P_2O_5$-containing acid solution. In some examples, a process for producing sulfuric acid and cement clinker may involve the following steps:

a) raw phosphate in a first step is digested with concentrated sulfuric acid and converted to calcium sulfate in the form of dihydrate, hemihydrate or a combination of hemihydrate and dihydrate, and phosphoric acid, b) the calcium sulfate is separated off as solid from the liquid phase of the suspension obtained, c) the calcium sulfate from step b), separated off from the phosphoric acid, and/or calcium sulfate/phosphogypsum from the stockpile is treated with an acid, to give a suspension with purified calcium sulfate and $P_2O_5$-containing acid solution, d) the purified calcium sulfate after step c) is separated off as solid from the liquid phase of the suspension obtained, e) the purified calcium sulfate separated off and obtained in step d) is mixed with admixtures and reducing agent, to give a raw meal mixture for cement clinker production, f) the raw meal mixture is burned to give the cement clinker, with sulfur dioxide being formed as offgas, and g) the sulfur dioxide formed is supplied as raw material to sulfuric acid production to produce the sulfuric acid, where the sulfuric acid produced can be used as starting material in phosphoric acid production and/or can be supplied to another utilization.

In one preferred embodiment of the above process, e1) the $P_2O_5$-containing liquid phase obtained from step d) is used as a feedstock in step a), more particularly as a portion of the sulfuric acid required for digesting the raw phosphate, and/or e2) the $P_2O_5$-containing liquid phase obtained from step d) is used as a feedstock for treating phosphogypsum from the stockpile according to step c), to give a suspension of purified calcium sulfate and $P_2O_5$-containing acid solution.

The observations that follow concerning the processes are valid for both afore-mentioned processes of the invention, insofar as they are applicable and there is no indication otherwise. They are also valid for the plants of the invention indicated below and for the devices used therein, insofar as they are applicable and there is no indication otherwise. Statements made regarding process steps and/or devices which concern only the more comprehensive process and to the more comprehensive plant, respectively, are of course based on said process/plant.

The processes of the invention are, in particular, integrated processes. The integrative approach as an overall concept, from the phosphogypsum to the calcium sulfate or to the cement clinker and sulfur dioxide in the case of the integrated process allows the dependency relationships/influencing factors to be harmonized for optimized choice of process, and, in association with this, it allows the accompanying flexibility of the process regime, with the possibility for incorporation into existing phosphoric and sulfuric acid plant complexes. Accordingly it is possible for all the process parameters and process stages of the overall complex to be tailored to one another for the purpose of achieving specific product qualities, starting from a variable feedstock character, such as the feedstock character of the apatite used in phosphoric acid production or of the phosphogypsum from current production or from the stockpile. This has not been considered to date. The combination of features of the integrative process of the invention cannot be derived from the prior art.

In the text below in this context the expressions "complex" and "plant" are used interchangeably. The liquid phase separated off and obtained in step d) can be introduced as a feedstock into the reaction unit of phosphoric acid production.

Through the process of the invention it is possible for impurities such as phosphorus, fluoride and any radioactive constituents, which have adverse consequences for the quality of the cement produced from the clinker, to be removed from the calcium sulfate/phosphogypsum, allowing existing limiting values or guide values for such impurities in the clinker to be observed. An advantage of the process is the flexibility, since the requisite degree of optimization of the $P_2O_5$ yield for the phosphoric acid process and hence also the purification of the phosphogypsum can be adjusted and controlled through adaptation of the parameters. The calcium sulfate processed by the process of the invention can therefore be used as a base material for clinker production with observance of the limiting values and/or guide values.

Through the process of the invention wherein the calcium sulfate obtained in phosphoric acid production from step b) is admixed and treated with an acid it is possible, depending on acid concentration, dwell time, solids/liquid ratio, and temperature, to increase the $P_2O_5$ yield in the phosphoric acid process and at the same time to reduce to the required degree the concentrations of the impurities which adversely affect the clinker process and the cement quality.

Stipulating the concentration of the impurities in the treated calcium sulfate can be done as a function of the desired raw meal composition for the clinker process. The concentration of the impurities can be monitored and controlled by an analytical method. The analytical method may be a direct or an indirect analytical method.

Particular advantages of the processes of the invention, especially of the integrated process, may include the following points:

1. Increase in the yield of phosphorus from the raw phosphate, hence better utilization of the raw phosphate employed for the purpose of phosphoric acid production 2. Use of the calcium sulfate/phosphogypsum produced as raw material for production of products of value 3. Conversion of the calcium sulfate/phosphogypsum to cement clinker as a raw material for cement production, and sulfur dioxide as a raw material for sulfuric acid production 4. The process for producing cement clinker and, respectively, cement can be run flexibly in terms of the starting quality of the phosphogypsum, and in combination with a phosphoric acid process, 5. The purification efficiency and filterability of the phosphogypsum for producing cement clinker can be targetedly adjusted, optimized and controlled by means of a simple analytical method (off-line and/or on-line).

6. The sulfuric acid produced from the $SO_2$ offgas can be introduced and consumed in the overall complex and also generated and, for example, circulated 7. Reduction in the effects of calcium sulfate/phosphogypsum deposition and/or dumping on the environment 8. Recovery and circulation of the sulfur used in the phosphoric acid process and/or in further utilization, and hence new sulfur used only to compensate losses. General exemplary embodiments are circulation of the sulfuric acid or the utilization of phosphogypsum from stockpiles. In the latter case, sulfuric acid must be exported; compensating the sulfur is necessary only in the context of circulation of sulfuric acid 9. Reduction in the CO2 footprint through the use of calcium sulfate/phosphogypsum as a raw material for cement clinker production 10. Integrative use of existing plant components of the phosphoric and sulfuric acid complex, and hence reduced additional capital investment.

The integrated process approach described here can be summarized in 6 categories of production processes:

Production of phosphoric acid and purified calcium sulfate with optimized phosphorus yield from phosphogypsum according to steps a) to d) of the process of the invention, Production of phosphogypsum of suitable quality for the cement clinker process according to steps c) and d) of the process of the invention, Production of the raw meal mixture specific to the cement clinker process, according to step e) of the process of the invention, Production of the cement clinker according to step f) of the process of the invention and optionally further processing of the cement clinker to cement, Production of sulfur dioxide gas with a quality suitable for the sulfuric acid process, according to step f) of the process of the invention, where the sulfur dioxide gas may also need to be subjected to offgas cleaning before being supplied to step g), Production of the sulfuric acid according to step g) of the process of the invention.

The process of the invention for producing phosphoric acid and purified calcium sulfate can also be used for optimizing existing phosphoric acid plants. The phosphoric acid production according to processes of the invention in step a) may be the customary wet process in which raw phosphate is reacted/digested with sulfuric acid to form phosphoric acid (digestion phosphoric acid).

Raw phosphate used comprises sedimentary and magmatic phosphate rocks, which in general are processed prior to use. The processing typically includes comminution and concentration in terms of the phosphorus content. For the processing, phosphate ore or phosphate rock, more particularly apatite-containing ore, may be subjected, for example, to calcination, flotation and/or conversion to monocalcium phosphate or dicalcium phosphate by means of inorganic acids.

The production of phosphoric acid by the customary wet processes according to step a) is general knowledge to the person skilled in the art. General descriptions of the process are found for example in Ullmann's Encyclopedia of Industrial Chemistry, 5th edition, 1991, vol. A19, "Phosphoric Acid and Phosphate", pp. 465-505.

The person skilled in the art is aware of the following processes for producing phosphoric acid: 1. dihydrate (DH) process, 2. hemihydrate (HH) process, 3. dihydrate-hemihydrate (DHH) process, 4. hemihydrate-dihydrate (HDH) process, and 5. dihydrate attack-hemihydrate filtration (DA-HF) process.

For the present invention in general one of the above five processes is to be used; in the case of processes 3. to 5. (DHH/HDH/DA-HF) there is recrystallization of calcium sulfate, which is not required for the process of the invention.

According to the process of the invention, in step a), the calcium sulfate which has been obtained, for example, by one of the abovementioned five processes, after removal from phosphoric acid production, is treated with an acid, thereby increasing the $P_2O_5$ yield.

The calcium sulfate formed in step a) is calcium sulfate in the form of dihydrate, hemihydrate or a combination thereof.

The phosphoric acid production plant known to the person skilled in the art comprises preferably a processing unit for phosphate rock, a reaction unit for the reaction of raw phosphate with sulfuric acid, and a separating unit, preferably a filtration unit, for the separation of calcium sulfate. In general the phosphoric acid production plant further comprises a sulfuric acid production plant, thus forming a phosphoric acid-sulfuric acid complex.

The phosphoric acid production plant according to the process of the invention comprises preferably a processing unit for phosphate rock, a reaction unit for the reaction of raw phosphate with sulfuric acid, and a first separating unit, preferably a filtration unit, for the separation of calcium sulfate. The phosphoric acid production plant according to the process of the invention, or the plant of the invention, further comprises a treatment unit for optimizing the phosphorus yield in association with the purification of the calcium sulfate from the phosphoric acid plant and/or from the stockpile, consisting of a purifying unit/reaction unit for calcium sulfate and of a second separating unit, more particularly a filtration unit, for the separation of the purified calcium sulfate. The phosphoric acid production plant according to the process of the invention generally further comprises a sulfuric acid production plant, thus forming a phosphoric acid-sulfuric acid complex.

In one embodiment of the process of the invention the sulfuric acid production plant may optionally be integrated in a combined system with the phosphoric acid production plant, in a phosphoric acid-sulfuric acid complex.

In the case of the phosphoric acid production process, according to step a), in the reaction of raw phosphate with sulfuric acid to form phosphoric acid, calcium sulfate is formed as a solid byproduct, and is separated off from the phosphoric acid according to step b). The separation may be accomplished, for example, by centrifuging, filtering, sedimenting or evaporating, with preference being given to mechanical separation. The solid calcium sulfate is separated off from phosphoric acid preferably by filtration. The separation comprises or consists of the separation of the calcium sulfate formed from the phosphoric acid (product acid) (first separation), preferably by filtration. Depending on process, the solid calcium sulfate (preferably filtercake) separated off by the first separation may optionally be subjected additionally to one or more washes with liquid, more particularly water, with subsequent separation, preferably filtration, of the liquid.

For the calcium sulfate separated off from the phosphoric acid and used in step c), it is possible to use the calcium sulfate according to step b) which is obtained directly after the first separation from the phosphoric acid, since further washing is not absolutely necessary. This allows a reduction in the filter area in the phosphoric acid process. It is, however, also possible for the calcium sulfate separated off from the phosphoric acid and used in step c) to use calcium sulfate which after the first separation from the phosphoric acid according to step b) has been subjected to one or more washes with a liquid, preferably water, before it is supplied to step c).

In a preferred embodiment of the process of the invention, the suspension obtained after step a) is separated without further washing only into a liquid phase containing phosphoric acid and a solid phase containing calcium sulfate and exhibiting residual moisture content, and the solid phase containing calcium sulfate and exhibiting residual moisture content can be supplied directly to step c).

The advantage of this embodiment is that after step e1) and/or step e2) of the process of the invention, there is only marginal influence on the water budget of the phosphoric acid plant.

Alternatively or additionally to steps a) and b), calcium sulfate from phosphoric acid production and already stockpiled can be used as the calcium sulfate used in step c). In one embodiment calcium sulfate obtained from steps a) and b) and optionally the stockpiled calcium sulfate, preferably calcium sulfate from stockpiles from phosphoric acid production, is used in step c).

In the phosphoric acid production complex, the reaction of raw phosphate with sulfuric acid takes place in the reaction unit of the phosphoric acid plant. The reaction mixture obtained is then conveyed to the separating unit, preferably filtration unit, of the phosphoric acid plant, where the phosphoric acid is separated or filtered off from the calcium sulfate formed, in one or more separating stages. The calcium sulfate for use in stage c) is taken from the separating unit or filtration unit from step b), preferably from the first separating stage, and/or stockpiled calcium sulfate from phosphoric acid production is used as calcium sulfate for the feed in stage c).

The calcium sulfate separated off and used in step c) is preferably calcium sulfate in the form of dihydrate, hemihydrate or a combination thereof.

After separation from the phosphoric acid, the calcium sulfate may be added directly to step c) or before being supplied to step c) may optionally undergo single, double or multiple washing with water. The free water content of the calcium sulfate separated off and used in step c) is in an order of magnitude such that an acid concentration that can be established in step c) with addition of the corresponding acid is in the range from 1 to 12 molar, preferably in the range from 3 to 10 molar, more preferably in the range from 5 to 8 molar.

In step c) of the process of the invention, the calcium sulfate from phosphoric acid production that is separated off is treated with an acid. The acid is added to the calcium sulfate to carry out the treatment. In this way a suspension with purified calcium sulfate is obtained after the treatment. The suspension obtained may be, for example, a sludge or a slurry. Through the treatment it is possible to reduce the level of impurities in the calcium sulfate that adversely affect the downstream cement clinker process and cement quality to the level required by the downstream cement clinker process.

An acid is added for the treatment of the calcium sulfate in step c). The acid is preferably a dilute acid. Dilute acids are acids that have been diluted with water (aqueous acids). The acid, preferably the dilute acid, is preferably an inorganic acid, e.g., hydrochloric acid, nitric acid, sulfurous acid and/or sulfuric acid, with sulfurous acid and/or sulfuric acid being particularly preferred.

In step c) the acid is added in an amount such that the ratio of solids to liquid (S/L ratio) in the suspension is in the range from 1/10 to 1/1, preferably 1/5 to 1/1, more preferably 1/5 to 1/1.3, more preferably 1/4 to 1/2. The ratio of solids to liquid (S/L ratio) is based on the mass of the solids in kilograms and the volume of the liquid in liters at a reference temperature of 20° C.

The concentration of the acid used is selected here such that the acid resulting from the treatment according to step c) is for example in the range from 1 to 12 molar, preferably in the range from 3 to 10 molar, more preferably in the range from 5 to 8 molar, the acid being an aqueous acid. 1 molar here refers to 1 mol of acid per 1 liter of solution at 20° C. Since the calcium sulfate for treatment contains water and since water of crystallization may be liberated in the course of the reaction, the concentration of the added acid may be higher than the concentration of the acid resulting after the addition. In the case of high residual acid contents in the phosphogypsum used, such as of free phosphoric acid, for example, however, the concentration of the added acid may also be lower than the concentration of the acid resulting after the addition. The concentration of the resulting acid may fluctuate over the entire reaction course. In general the molarity of the added acid is preferably within the ranges stated above and below for the resulting acid.

At the start of the leaching in step c) of the process of the invention, the acid concentration may rise. The explanation for this is the release of free acids (Brønsted acids such as phosphoric acid and/or Lewis acids such as trivalent iron, for example) contained in the impure phosphogypsum. Depending on reaction conditions, determination of the acid concentration may enable an indirect estimation of the free acids present. Because of the water of crystallization liberated from the gypsum and/or hemihydrate during the recrystallization in step c), however, the acid concentration of the added acid necessarily drops (again). Conversely, the release of the water of crystallization may serve as an indication of the progress of reaction. It has been found that the acid concentration, however, does not fall constantly, but instead rises again after passing through a minimum. The crossing of this minimum represents at the same time a maximum conversion of the dihydrate and/or hemihydrate to the anhydrite. At the same time the leaching efficiency approaches a maximum, through the washing-out of $P_2O_5$ and F, during the recrystallization. Once the maximum conversion to the anhydrite is reached, the leaching efficiency exhibits only a slight further increase. The efficiency of the washing-out of $F/P_2O_5$ is in turn an essential characteristic value for the quality of the cement clinker being produced from the phosphogypsum, since the $F/P_2O_5$ content has a critical influence on the properties of the clinker, among other things. From the standpoint of process economics it is expedient for a given process to be operated for as short a time as possible in order to enable maximal converted volume flows. Hence in the process of the invention, with desired maximization of the $F/P_2O_5$ leaching, it is likewise sensible to minimize the recrystallization reaction time in order to maximize the conversion of dihydrate and/or hemihydrate to the anhydrite and so to maximize production capacity. At the same time there is a minimum necessary recrystallization time in order for the necessary marginal parameters such as the $F/P_2O_5$ leaching, for example, to be brought to a desired level. The process-economic optimum can be identified, consequently, as a time interval around the time $t_{MIN}$, where $t_{MIN}$ is characterized by the presence of the minimal acid concentration during the recrystallization of dihydrate and/or hemihydrate to anhydrite. In one preferred embodiment, accordingly, the separating process according to step d) should be started within this time interval around $t_{MIN}$.

In accordance with the present disclosure, therefore, the separation of the calcium sulfate from the suspension in step d) (or of the solid from the liquid phase of the suspension from step c)) is started at a time in a range from $t_{MIN}+30$ minutes to $t_{MIN}-30$ minutes, more preferably in a range from $t_{MIN}+25$ minutes to $t_{MIN}-25$ minutes, more preferably still in a range from $t_{MIN}+20$ minutes to $t_{MIN}-20$ minutes, more preferably still in a range from $t_{MIN}+15$ minutes to $t_{MIN}-15$ minutes, most preferably in a range from $t_{MIN}+10$ minutes to $t_{MIN}-10$ minutes, where $t_{MIN}$ is defined as the time at which the acid concentration passes through a minimum during the treatment in step c).

The initial acid concentration is the acid concentration which is measured in a period of up to one minute after addition of the acid which is added in step c) for the treatment.

As discussed above, the acid concentration reduces in the course of the treatment down to a minimum acid concentration $c_{MIN}$ at the time $t_{MIN}$ and then rises again. The acid concentration and the time profile can be determined according to customary analytical methods, described below, it being assumed for the calculation, for simplicity, that the measured acid concentration is attributable entirely to the acid added for the treatment.

It has also been found that the time of the above-described process-economic optimum can also be ascertained by a decrease in the acid concentration which has been reduced at least by a minimum of its initial acid concentration. Here again the dilution of the acid represents the progress of the recrystallization and hence represents an achieved degree of $F/P_2O_5$ leaching. There is therefore a time interval around the time $t_1$, with $t_1$ being characterized as the time at which the acid concentration, during the recrystallization of dihydrate and/or hemihydrate to anhydrite in step c), has been reduced at least by 1.0%, more preferably at least 2.0%, more preferably still at least 4.0%, more preferably still at least 5.0% and more preferably still at least 7.0% of its initial acid concentration. In a further preferred embodiment, accordingly, the separating process according to step d) ought to be started within this time interval around $t_1$.

In one preferred embodiment, therefore, the separation of the calcium sulfate from the suspension in step d) is started at a time in a range from $t_1+20$ minutes to $t_1-20$ minutes, preferably in a range from $t_1$ to $t_1+20$ minutes, where $t_1$ is defined as the time at which the acid concentration during the treatment in step c) has been reduced at least by 1.0%, preferably at least by 4.0%, of its initial acid concentration.

The initial acid concentration and the acid concentration during the treatment are subject to the comments made above. A reduction in the initial acid concentration by 1% at time $t_1$ here means that the acid concentration is 99% of the initial acid concentration.

In one preferred embodiment, in relation to the time interval $t_1$, the initial acid concentration is reduced by 1.0 to 15.0%; 3.0 to 12.0%; 4.0 to 10.0%; 4.5 to 10.0%; 5.0 to 9.0%; 5.0 to 8.5%; 5.5 to 8.0%; 6.0 to 8.0%, it being preferred for the separation of the calcium sulfate from the suspension in step d) to be started at a time at which the reduction in the acid concentration is within one of the stated ranges.

For the times $t_{MIN}$ and $t_1$ it is the case that $t_1$, depending on the definition of the process-economic optimum, may be less than (e.g., maximization of the conversion rate for minimum requirement with regard to $P_2O_5$ leaching in respect of cement clinker quality), greater than (e.g., maximization of $P_2O_5$ leaching and therefore efficiency boost for an integrated phosphoric acid plant) or the same as $t_{MIN}$ (e.g., efficient $P_2O_5$ leaching in conjunction with extremely optimal filterability).

In a further preferred embodiment it is advantageous to carry out the separating process d) of the process of the invention, for the separation of the solid from the liquid phase of the suspension from step c), at a time in a range from $t_1+30$ minutes to $t_1-30$ minutes, preferably in a range from $t_1$ to $t_1+30$ minutes, more preferably in a range from $t_1+25$ minutes to $t_1-25$ minutes, more preferably in a range from $t_2$ to $t_1+25$ minutes, more preferably still in a range from $t_1+20$ minutes to $t_1-20$ minutes, more preferably in a range from $t_1$ to $t_1+20$ minutes, especially preferably in a range from $t_1+15$ minutes to $t_1-15$ minutes, preferably in a range from $t_1$ to $t_1+15$ minutes, most preferably in a range from $t_1+10$ minutes to $t_1-10$ minutes, preferably in a range from $t_1$ to $t_1+10$ minutes.

In a further preferred embodiment said process for separating the solid from the liquid phase of the suspension from step c) according to step d) may be initiated 20 minutes, 15 minutes or else 10 minutes before the minimum acid concentration is reached. Initiating the separating process according to step d) may also take place 5 minutes, 10 minutes or 15 minutes after the minimum acid concentration has been reached. The initiation of the separating process according to step d) may also take place preferably in a time interval of 20 minutes before and 10 minutes after, or 15 minutes before and 5 minutes after, or 10 minutes before and 5 minutes after the minimum acid concentration has been reached.

In a further preferred embodiment said process of separating the solid from the liquid phase of the suspension from step c) according to step d) may be initiated 20 minutes, 15 minutes, 10 minutes or else 5 minutes before the time $t_1$ is reached. Said separating process may also take place 5 minutes, 10 minutes or else 15 minutes after the time $t_1$ has been reached. In one preferred embodiment the separating process may take place in a time interval of 15 minutes before and 10 minutes after $t_1$, or 10 minutes before and 10 minutes after $t_1$, or 10 minutes before and 5 minutes after $t_1$ or 5 minutes before and 10 minutes after $t_1$ or 5 minutes before and 5 minutes after $t_1$.

The acid concentration, including the minimum acid concentration, may be determined either continuously or discontinuously. The minimum acid concentration may be measured and/or determined directly or indirectly. An on-line and/or off-line analytical system may be utilized for the measurement. To determine the acid concentration it is possible for example to use methods such as acid-base titration (e.g. by potentiometry, by thermometry or using acid-base indicator, etc.), determination of the pH of the acid or of a defined dilution of the acid, density determination of the acid, and/or combined methods encompassing density and/or speed of sound and/or refractive index. The examples selected for acid determination are not intended in any way to restrict the scope of the invention claimed.

In one preferred embodiment the acid concentration is determined by at least one measuring apparatus in the reaction vessel or in a circulating flow of the reaction vessel. In general the acid concentration is directly or indirectly measured or calculated, with the parameters or measurement locations needed for this purpose being ascertained at a point in the process that is suitable for that purpose. The person skilled in the art is familiar with the choice of the measuring and calculating methods and also the positioning of the measuring points.

The acid concentration advantageously is either actively measured or calculated indirectly or directly through one or more captured process parameters. It is also preferred for the treatment in step c) to be monitored by means of an analytical method. It is further preferred for the analytical method to be able to determine a change in the acid concentration of the acid used in step c), directly and/or indirectly, and/or for the analytical method to be able to ascertain the P and/or F content directly and/or the mineralogy of the solid.

It is further preferred for the analytical method used to be an acid-base titration, the equivalent point of the acid being determined preferably by potentiometry and/or thermometry and/or an acid-base indicator. It is further preferred for the analytical method used to be a pH determination of the acid and/or a pH determination of a defined dilution of the acid and/or density determination of the acid and/or a combined method made up of density and/or speed of sound and/or refractive index. It is further preferred for the analytical method to be an on-line method, preferably a process analyzer.

It is further preferred for the $D_v(50)$ of the grain size distribution of the calcium sulfate obtained in step d), more particularly calcium sulfate anhydrite, to be in the range of 0.5-100 $\mu m$, preferably 1-50 $\mu m$, more particularly 2-30 $\mu m$.

The acid resulting from the treatment according to step c) is preferably a 1 to 12 molar, preferably 5 to 8 molar, sulfurous acid or a 1 to 12 molar, preferably 5 to 8 molar, sulfuric acid. The added acid is therefore preferably a sulfurous acid or a sulfuric acid.

The treatment in step c) is carried out at reaction temperature in the range between ambient temperature and boiling point of the reaction mixture, e.g., at a temperature in the range from 15° C. to 100° C., preferably 30° C. to 80° C., more preferably 45 to 75° C.

The duration of the treatment in step c) or the reaction dwell time for the establishment of the amounts of impurities in the acid is in the range from 5 minutes to 120 minutes, preferably from 15 to 100 minutes, more particularly 15 to 90 minutes, very preferably 20 to 60 min.

In one particularly preferred embodiment the treatment is carried out using a 5 to 8 molar acid, more particularly sulfurous acid and/or sulfuric acid, in an S/L ratio of 1/5 to 1/1, preferably 1/5 to 1/1.3, more preferably 1/4 to 1/2, where the treatment is carried out at a temperature of 30 to 80° C., preferably 45 to 75° C., and a dwell time of 15 to 90 minutes, preferably 20 to 60 min. The reaction parameters here are preferably established and optimized by means of an on-line and/or off-line analytical system which is based on the dilution of the acid used by liberated water of crystallization on the basis of the recrystallization of the phosphogypsum at least partially to anhydrite. Preference here is given to a 5 to 7 molar acid and to high temperature, in order to achieve effective separation (e.g., in the case of filtration) of the purified calcium sulfate, whereas at higher concentrations (e.g., 6.5-8 molar) shorter dwell times and/or lower temperatures are sufficient to achieve the same purification efficiency.

One of the factors enabling good filterability is the presence of relatively large crystals. Crystal growth is suitably promoted on the one hand by lower temperatures and/or lower concentration of the acid, more particularly of sulfuric acid. In terms of the process of the invention, preferred constellations of temperature and acid concentration are those such that calcium sulfate anhydrite in particular is formed.

Furthermore, under otherwise constant conditions, good filterability is promoted by minimizing the dwell times, without detriment to the leaching efficiency. The end point of the reaction for optimal filterability may likewise be ascertained by way of the determination of the acid concentration. In accordance with the definition of $t_{MIN}$ above, it has been observed that optimal filterability of the purified calcium sulfate may be achieved in time intervals less than or equal to $t_{MIN}$ (time of minimum acid concentration).

As described above, there is a direct association between the purification efficiency, especially with regard to P and F content, and the recrystallization to give calcium sulfate anhydrite. Freely accessible phosphate, particularly residual phosphoric acid which has remained in the phosphogypsum, can be removed easily with just a short dwell time and/or with low acid concentrations and/or with high S/L ratio. In this case there is no need for recrystallization when using impure calcium sulfate dihydrate. For better purification efficiency in terms of the phosphogypsum, preference is given to selecting a higher acid concentration and/or higher temperature and/or lower S/L ratio. This promotes the conversion at least partly to anhydrite.

The determination of the acid concentration over the time profile of the reaction with selected reaction condition such as initial concentration of the acid, reaction temperature and S/L ratio may be carried out in advance, in a laboratory (off-line) for example, in order to ascertain ideal reaction parameters for the process.

In one preferred embodiment the acid concentration is determined over the time profile of the reaction during production. In this case the acid concentration may be ascertained off-line (e.g., in a laboratory) and/or on-line (e.g., by an on-line analyzer). The advantage of this embodiment is that the process can be monitored directly and reaction can be made to production fluctuations (e.g., impurity, residual moisture content, and/or total water content of the phosphogypsum, temperature fluctuations in the process, water balance of the total complex, etc.) with suitable adaptations of the reaction parameters.

During the treatment of step c), the suspension or the reaction mixture is preferably held in motion for the purpose of establishing the levels of impurities, by circulation, stirring or blowing-in gas, for example.

For the step c) the calcium sulfate generated in phosphoric acid production is supplied from the first separating unit, preferably filtration unit, and/or the calcium sulfate is supplied from a stockpile, preferably from a stockpile from phosphoric acid production, to a purifying unit (calcium sulfate reaction unit). Additionally or alternatively in step e2) the $P_2O_5$-containing liquid phase, preferably an acid filtrate, obtained from step d) may be used in order to purify calcium sulfate from the stockpile (step c). The resulting suspension may then in turn be supplied to step d) for the separation of the solid from the liquid phase. The purifying unit for step c) may be a simple stirring device, e.g., stirred vessel.

In one embodiment of the process of the invention the calcium sulfate from a stockpile, preferably a stockpile from phosphoric acid production, may be purified, and the calcium sulfate from the first separating unit may be purified, in different purifying units.

In step d) of the process of the invention, the purified calcium sulfate after the treatment is separated off as a solid from the liquid phase of the suspension obtained. The suspension obtained may be a slurry. The separation of solid or of purified calcium sulfate and liquid phase from the suspension is more particularly a mechanical separation and may be accomplished, for example, by centrifuging or filtration, with filtration being preferred.

The purified calcium sulfate obtained in step d), as obtained after the separation, may be dihydrate, hemihydrate or anhydrite or may be a mixture of at least two of said components, preferably is calcium sulfate in the form of anhydrite. The desired composition of the calcium sulfate is dependent on the required degree (cement/clinker producer) and/or desired degree (phosphoric acid producer) of $P_2O_5$ reduction. By the treatment with acid and subsequent separation from the liquid phase it is possible in particular to reduce the level of phosphorus and fluorine in the calcium sulfate, these being present as impurities. The liquid phase separated off is generally an acid-containing aqueous solution, whose constituents include water and $P_2O_5$.

In one preferred embodiment the purified calcium sulfate separated off and obtained in step d) contains at least 5 wt %, preferably at least 30 wt %, more preferably at least 50 wt % of anhydrite, based on dry calcium sulfate.

The $D_v(50)$ of the grain size distribution of the calcium sulfate produced in step d), more particularly calcium sulfate anhydrite, after the purification is for example 0.5-100 μm, more preferably 1-50 μm, more particularly 2-30 μm. The $D_v(50)$ is defined as the degree at which 50 vol % of the particles have a diameter greater than the specified value.

The purified calcium sulfate separated off and obtained in step d) may, optionally after drying, have a moisture content in the range from 0 to 60 wt %, preferably from 10 to 50 wt %. The water content refers to free water; any water of hydration present is disregarded.

In one preferred embodiment in step d) the liquid phase obtained after separation from the solid is used as a feedstock in phosphoric acid production step a). Alternatively or additionally the liquid phase, before being used in phosphoric acid production according to step a), may also be used for treating phosphogypsum from the stockpile and, after separation has taken place, as in step d), may be supplied as a feedstock to the phosphoric acid production according to step a). The liquid phase or the filtrate may be used in the existing phosphoric acid production, more particularly in the existing phosphoric acid-sulfuric acid complex, as so-called "recycle acid", which can be supplied to the reaction unit of phosphoric acid production for reaction with the raw phosphate.

For step d) the suspension/slurry contained in the purifying unit is transferred to a second separating unit (calcium sulfate separating unit), in which the liquid and the resulting solid (purified calcium sulfate) can be separated from one another. The second separating unit may be, for example, a filtration unit or a centrifuge unit, with a filtration unit being preferred.

In one embodiment of the process of the invention, the separation of the resultant suspension/slurry of the calcium sulfate from a stockpile, preferably a stockpile of phosphoric acid production, and the separation of the resultant suspension/slurry of the calcium sulfate from the first separating unit may take place in different calcium sulfate separating units (consequently different second separating units). For this embodiment it is preferable for the purification of calcium sulfate from a stockpile, preferably a stockpile from phosphoric acid production, and the purification of the calcium sulfate from the first separating unit to take place in different purifying units.

Through the treatment with dilute acid and subsequent separation from the liquid phase it is possible to reduce the levels of phosphorus and fluorine and of other impurities, such as heavy metals, radioactive components, rare earths (lanthanides), trace elements, for example, in the calcium sulfate. The process of the invention enables the production of the calcium sulfate serving as starting product in the quality needed for the clinker/cement process. The levels of the impurities can be established flexibly. Of the impurities contained in the calcium sulfate, the phosphorus and fluorine components preferably can be adjusted in a targeted way to the required contents.

The purified and processed calcium sulfate separated off that is used may be, directly, the purified calcium sulfate separated off and obtained in step d). It is, however, also possible for the purified calcium sulfate obtained in step d) to be subjected to one or more further purification steps, more particularly for removing rare earths and possibly for removing radioactive elements and/or heavy metals, such as Cd, Pb, Hg, for example, especially before the purified calcium sulfate is supplied to step e). The optional additional purification steps are detailed below.

The calcium sulfate obtained after step d) and, in the case of the more comprehensive process of the invention, used in step e) is generally dry or dried, with the water content being preferably below 15 wt %, more preferably below 10 wt/o, more preferably still below 5 wt %, even more preferably below 1 wt %, and most preferably below 0.1 wt %. The water content here refers only to free water; any water of hydration present is disregarded.

The purified calcium sulfate obtained after step d) and, in the case of the more comprehensive process of the invention, used in step e) preferably has a $P_2O_5$ content of less than 0.5 wt %, preferably less than 0.25 wt %, more preferably less than 0.05 wt %, and a fluoride content of less than 0.5 wt %, preferably less than 0.25 wt/o, more preferably less than 0.15 wt %, more preferably still of less than 0.05 wt %. A purified calcium sulfate having the stated purity in terms of $P_2O_5$ and fluorine is preferably obtained already after step d). The purification step according to steps c) and d) and optionally the purification step for removing rare earths may bring about complete or partial removal of any unwanted heavy metals and/or radioactive elements, especially radioactive elements, that are also present in the calcium sulfate.

In step e) of the process of the invention, the purified and processed calcium sulfate separated off is mixed with admixtures and reducing agent, to give a raw meal mixture for cement clinker production. The calcium sulfate in this case is mixed with the required admixtures for the requisite cement clinker quality in the correct ratio. As already indicated, the Müller-Kühne process and the OSW-Krupp process are long-established processes for the reaction of calcium sulfate with admixtures and reducing agent to form cement clinker and $SO_2$ or sulfuric acid. Further details of this may be found in the technical literature, for example Ullmann's Encyclopedia of Industrial Chemistry, 5th edition, 1986, vol. A5, "Cement and Concrete", pp. 489-537, or patent specification AT 292539 B.

Cement clinker is produced in general from a raw material mixture referred to as raw meal, comprising calcium oxide, silicon dioxide and oxides of aluminum and iron; see, for example, Ullmann's Encyclopedia of Industrial Chemistry, 5th edition, 1986, vol. A5, "Cement and Concrete", pp. 489-537.

As well as purified phosphogypsum, components for producing the raw meal in step e) may be the admixtures known to the person skilled in the art for the clinker composition, which are mixed into the calcium sulfate, with the calcium component in the raw meal mixture being formed entirely of the purified calcium sulfate separated off. "Entirely" here does not rule out the possibility that calcium may be present in the admixtures, in which case calcium may be present preferably only in small amounts or as impurities in the admixtures. "Entirely" here means that at least 95 wt %, more preferably at least 99 wt %, more preferably still at least 99.9 wt % of the calcium component used, preferably the calcium contained in the cement clinker, originates from the purified calcium sulfate separated off. As a result, the admixtures used are preferably free or largely free of calcium. It is, however, also possible for calcium to be present in the admixtures, such as in the Al carrier, Si carrier and/or Fe carrier. Admixtures are, in particular, Al carriers, examples being bauxites, clays and claystones, shales, etc., Fe carriers, examples being iron ores, laterites, etc., and Si carriers, examples being sands, sandstones, quartzites, clays and claystones, shales, etc., and one or more reducing agents, such as a carbon carrier and/or hydrocarbon carrier, examples being charcoal, coke, petcoke or charcoal/coke produced from renewable raw materials (biocharcoal/biocoke), and/or elemental sulfur.

It will be understood that the nature and amount of the admixtures are selected such that together with the calcium sulfate they result in a raw meal having suitable chemical composition for a cement clinker.

In one preferred embodiment the purified calcium sulfate from step d) that is separated off and used for step e) accounts for more than 70 wt %, preferably more than 80 wt %, more preferably more than 90 wt % of the total calcium sulfate in the raw meal mixture. For the remainder of the calcium sulfate in the raw meal mixture obtained in step e), this remainder not being the purified calcium sulfate separated off and obtained in step d), calcium sulfate from customary alternative sources can be used.

Suitable fuels are solid fuels, examples being charcoal, coke, petcoke, solid secondary fuels and/or substitute fuels, etc., and also liquid fuels, examples being oil, heavy oil, liquid secondary fuels, etc., or gaseous fuels, examples being natural gas, biogas, hydrogen, or else a combination of aforesaid fuels.

Additives and/or mineralizers for accelerated breakdown of the purified calcium sulfate and/or for improved formation of clinker minerals may likewise be added.

Raw meal for the production of cement clinker denotes the mixture of substances comprising calcium sulfate, all customary cement admixtures, and additives/mineralizers, including reducing agents.

For the raw meal preparation in step e), the purified calcium sulfate is dried preferably to a desired residual moisture content, in a drum dryer and/or entrained flow dryer and/or fluidized bed, for example; the water content of the dried calcium sulfate is, for example, below 22 wt %, preferably 12-14 wt %, more preferably below 5 wt %, more preferably still below 1 wt %. The water content here refers only to free water; any water of hydration present is disregarded.

The dried calcium sulfate and all of the rest of the admixtures are passed to a customary tank and/or mixing device. Employed for this purpose, for example, is an elongated mixing bed and/or circular mixing bed and/or trough tank and/or open-air tank, and/or conventional silos, such as a tangentially mixed silo, multi-cell silo, conical silo or multi-chamber silo. For example, a mixing bed of this kind is described in detail in DE 10252585, and silo types of these kinds are described in more detail in DE10118142 or DE 10344040.

The raw materials (calcium sulfate and admixtures) are ground separately or collectively to the fineness needed for the clinker process. This comminution may be executed as a mill-drying operation, in which waste heat from the process (e.g., preheated gases) and/or heat supplied specifically (e.g., offgases from a hot gas generator) are utilized.

Comminution equipment used for the comminution is equipment such as at least one vertical roll mill and/or a roll press and/or a stirred ball mill and/or ball mill and/or vertical roller mill and/or rod mill and/or magnetic mill. Such equipment is known, for example, from property rights DE 102012111217, DE 102014108334 or DE 102017114831.

The ground raw materials are fed collectively or separately to one or more silos for intermediate storage and/or homogenization.

The chemical composition of the raw meal mixture is checked continuously before it is introduced into the clinker process, and, in the event of deviations from specified target values, it is corrected by changes in the metered additions.

The raw meal thus pretreated is introduced into the clinker plant in a metered way, optionally together with reducing agent.

The reducing agent serves to assist the elimination of $SO_2$ in the thermal breakdown of the purified calcium sulfate. The reducing agent is crushed and/or ground separately to the necessary fineness. This comminution may be performed as a mill-drying operation. The reducing agent thus prepared, together with the pretreated raw meal, is supplied to the clinker plant and/or separately at one or more points of the clinker plant.

Alternatively the raw meal, with a liquid fraction of the mixture of 9 wt %-22 wt %, preferably between 12 wt %-14 wt %, may be supplied to a shaping device for producing agglomerates. These agglomerates may be dried in a separate device and stored intermediately. The raw meal thus agglomerated is then supplied to the preheating device and to the burning process. The agglomerates have a size of more than 250 μm, preferably more than 500 μm, up into the low mm range. The shaping device operating may be, for example, a press and/or a pan and/or a drum and/or a mechanical fluidized bed reactor and/or a shaping stirred mixer.

In step f) of the process of the invention, the raw meal produced in step e) is converted to cement clinker by a thermal process, more particularly in a cement clinker process unit, with sulfur dioxide being formed as offgas. The cement clinker generated in step f) can be used for cement production.

In step f) the raw meal is preheated to a temperature of up to 800° C. preferably with process gases from the burning or cooling process in order to reduce the energy consumption, and adhering surface moisture is driven out in this process, and the adjuvants are at least partly calcined at the same time.

On further preheating above 800° C., the majority of the calcium sulfate is broken down under the action of the reducing agent and $SO_2$ is formed.

The preheating and breakdown of the raw meal may be carried out, for example, in a heat exchanger, preferably an entrained flow heat exchanger.

The $SO_2$-containing process gas is preferably separated out here by a separating system downstream of the preheating device, and is supplied to a utilization process such as a sulfuric acid plant, for example.

In a subsequent step, the raw meal is subjected to the final breakdown and then the cement clinker is formed (clinker burning); the process gases from this step are supplied to the heat exchanger. This burning of the raw meal takes place in a furnace, preferably a rotary furnace. The burning temperature for cement clinker production may be situated, for example, in the range from 1200° C. to 1600° C., preferably at a temperature from 1200° C. up to 1500° C. The burning time may be 5 minutes to 60 minutes, for example.

In one preferred embodiment the raw meal is burned with process air having an oxygen fraction of more than 21 vol %, preferably more than 45 vol %, more preferably more than 60 vol %, and up to 100 vol %. Such process air can easily be produced by admixing of oxygen. This is a particularly preferred embodiment of the oxyfuel process. Details of the oxyfuel process are described for example in EP 2449328 A1, EP 1037005 B1, WO 2019-211196 A1, WO 2019-211202 A1 or JP 2007-126328 A, to which reference is made.

Through the use of oxygen-enriched process air it is possible to raise the $SO_2$ concentration in the process gas, thereby facilitating the recovery of sulfuric acid from $SO_2$-containing gases. Supported by further measures for boosting the $SO_2$ concentration in the process gas, it is possible in this way to achieve a preferred $SO_2$ concentration in the process gas of 13-15%, more preferably of 18-20%.

The abovementioned process air may have been utilized beforehand for cooling the burned material. It is likewise conceivable for this process air to be supplied directly to the furnace. It would likewise be conceivable for the process gas to be drawn off at least partly at a bypass system and/or from the entrained flow reactor, then enriched with oxygen, and passed back to the burning process.

The clinker coming from the furnace is cooled down preferably by a suitable cooling system to a temperature of below 120° C., preferably below 100° C. The output air from the cooler may be supplied at least partly to the burning process and/or the preheating process and/or the raw meal production and/or the calcium sulfate drying. The process air supplied to the cooling system may be at least partly enriched with oxygen. It would likewise be conceivable to utilize at least a portion of the cooler output air for the purpose of power generation. The material cooled down by the cooling process, after possible further process steps, is supplied to a tank facility and/or packing facility.

The cement clinker thus produced can be processed further to cement. The cement clinker or cement produced by this process has a smaller $CO_2$ footprint than a customary clinker or cement produced on the basis of carbonatic rocks.

The abovementioned processes, such as the use of phosphogypsum as $CO_2$-neutral raw material and the use of the oxyfuel process, lower the $CO_2$ footprint of the cement plant. In addition, the use of at least partly regenerative power for operating the plant components may lower the $CO_2$ footprint further.

In step g) of the process of the invention, the sulfur dioxide formed in step f) is supplied as raw material to sulfuric acid production in order to produce sulfuric acid, by the single-contact or double-contact process, for example. Sulfuric acid production based on $SO_2$ is very familiar to the person skilled in the art. Details relating to this may be found in the technical literature, for example Ullmann's Encyclopedia of Industrial Chemistry, 5th edition, 1994, vol. A25, "Sulfuric Acid and Sulfur Trioxide", pp. 635-705, or Handbook of Sulphuric Acid Manufacturing, 2008 edition, DKL Engineering, ISBN 978-0-9738992-0-7.

The sulfuric acid produced in step g) may be used, for example, in phosphoric acid production as a starting material for reaction with the raw phosphate. Alternatively the sulfuric acid produced, as and when required, may be supplied to a further or different utilization. The treated sulfur dioxide gas may optionally be supplied to the existing sulfuric acid production plant in the phosphoric acid production, or to a new sulfuric acid production plant.

In one preferred embodiment the sulfur dioxide diverted as offgas from the cement clinker process unit in step f) is supplied to a sulfur dioxide offgas treatment, before being supplied to the sulfuric acid production according to step g). The offgas treatment is preferably an offgas purification for removing particulate solids and residual moisture from the $SO_2$ gas.

In an optional variant of the process of the invention, the process comprises an additional purification step for the calcium sulfate obtained after step d), this step being performed more particularly when the calcium sulfate is mixed subsequently with the admixtures and reducing agent according to step e). In the case of this additional purification step, rare earth metals possibly present as an impurity can be washed out of the calcium sulfate.

In the case of the optional additional purification step for removing rare earths from the calcium sulfate, particularly prior to supply to step e), the purified calcium sulfate obtained in step d) is preferably treated with a liquid, preferably water or with an aqueous solution containing salt and/or chelate ligand. After the treatment, the calcium sulfate is separated off in solid form from the liquid phase in the suspension thus obtained. The calcium sulfate thus further purified and separated off is then supplied to step e). The liquid phase contains one or more rare earths as dissolved ions and can be passed to a further processing facility for recovery of the rare earths. This facility comprises, for example, the conversion of sparingly soluble rare earth sulfates into soluble forms.

The process of the invention may also serve to remove radioactive elements and/or heavy metals. The purified calcium sulfate obtained after step d), given suitable adjustment of the reaction conditions (S/L ratio, dwell time, concentration of acid, and temperature), shows distinct depletion of radioactive elements, such as thorium and uranium, for example. In the case of the further optional purification step for recovery of rare earths, it is also possible to remove heavy metals (and further radioactive constituents), such as cadmium and lead, for example, through a suitable choice of the processing step. The purified calcium sulfate, before being supplied to step e), may therefore have a reduced phosphorus and fluorine content and optionally a reduced content of rare earths, radioactive elements and/or heavy metals. It will be understood that the reduced content of the respective element relates to the comparison with the content of the respective element in the calcium sulfate supplied to step c).

The integrative approach or integrative process of the invention is characterized in particular by the following process operations, which may be combined, for example, in their entirety or optionally for the production of cement clinker/cement and sulfuric acid from calcium sulfate:

Chemical and thermal modification of the phosphoric acid process for specific production of a phosphogypsum quality suitable for the cement clinker process, and for enhanced phosphorus yield from the raw phosphate Mechanical removal of the phosphogypsum from the ongoing phosphoric acid process, for example by centrifugation, filtration, evaporation or settling/sedimentation of the calcium sulfate/phosphogypsum sludge Chemical-thermal and mechanical separation of phosphorus from the phosphogypsum, for example by chemical conversion, recrystallization, precipitation, flocculation Chemical-thermal and mechanical separation of fluorine from the phosphogypsum, for example by chemical conversion, recrystallization, precipitation, flocculation Chemical-thermal and mechanical separation of radioactive components from the phosphogypsum, for example by chemical conversion with heating/cooling, recrystallization, precipitation, flocculation Chemical-thermal and mechanical separation of heavy metals from the phosphogypsum, for example by chemical conversion with heating/cooling, recrystallization, precipitation, flocculation Chemical-thermal and mechanical separation of rare earths from the phosphogypsum, for example by chemical conversion with heating/cooling, recrystallization, precipitation, flocculation Chemical and/or thermal and/or mechanical dewatering of the phosphogypsum, for example by heating/cooling, flocculation and precipitation, filtration Mechanical treatment of the dry phosphogypsum, for example by comminution, sifting Mixing of the phosphogypsum with additives to give a raw meal mixture for achieving specific and commercial cement clinker/cement qualities Thermal and mechanical separation of the sulfur dioxide from the raw meal mixture as part of the burning process during cement clinker production Thermal and chemical conversion of the raw meal mixture to cement clinker Chemical and mechanical conversion of the cement clinker to commercial cement quality Dry-chemical and wet-chemical purification of the sulfur dioxide-containing offgas separated off, for example by electrofiltration, absorption Chemical and thermal modification of the sulfuric acid process for incorporation and use of the sulfur dioxide generated in plants for generating sulfuric acid Chemical conversion of the purified sulfur dioxide-containing offgas to commercial-quality sulfuric acid which is reusable in the phosphoric acid process, for example by the single-contact or double-contact process.

According to the available quality of the raw phosphate used and of the resultant calcium sulfate consequently required, the production processes have to be selected flexibly and matched to one another in terms of the choice of the process operations and parameters.

The quality of the calcium sulfate that is achieved from the phosphoric acid process is dependent on factors such as raw phosphate used, the process conditions in the digestion of the raw phosphate with sulfuric acid after step a), and the process conditions for the purification/raising of the $P_2O_5$ yield after step c).

The extent of the purification, especially in terms of the reduction in the phosphorus and/or fluorine content, of the calcium sulfate in step c) may be adjusted in due consideration of the impurities present in the admixtures used, and of the guide values for fluorine and phosphorus that are to be observed for the cement clinker. The guide values for phosphorus are preferably not more than 1.0 wt %, more preferably not more than 0.5 wt %, more preferably still not more than 0.1 wt % of $P_2O_5$, and/or the guide values for fluorine are preferably not more than 0.5 wt %, more preferably not more than 0.25 wt %, more preferably still not more than 0.1 wt % of F. This is possible because of the integrative approach, as all of the process steps are considered collectively in due consideration of their particular requirements. The extent of purification may be established by adaptation of the parameters in step c), such as S/L ratio, acid concentration, treatment temperature and treatment time, for example. The purification efficiency here is preferably ascertained indirectly by means of on-line and/or off-line determination of the acid concentration during the leaching reaction of the calcium sulfate in step c).

The liquid budget, especially the water budget, of phosphoric acid production is changed only insignificantly, if at all, by the integrated process, especially since the liquid input, especially water input, for purification of the calcium sulfate in the process according to step c) can be coupled to the liquid budget, especially water budget, of phosphoric acid production. The liquid budget or water budget of phosphoric acid production comprises the liquid or the water which is supplied to the production, and the liquid or the water which is discharged from the production. Changes in the liquid budget, more particularly water budget, have a significant influence on the efficiency of the process steps in phosphoric acid production.

The invention relates further to a plant for producing phosphoric acid and purified calcium sulfate by reaction of raw phosphate with sulfuric acid, where the plant comprises the following devices:

a) a reaction unit which possesses at least
        i. a raw phosphate feed and
        ii, at least a concentrated sulfuric acid feed line, where said reaction unit is configured to form a suspension at least comprising phosphoric acid and calcium sulfate, where the calcium sulfate is present in the form of dihydrate, hemihydrate or a combination of hemihydrate and dihydrate, and the reaction unit comprises an outlet for said suspension,
    b) a first separating unit, which is configured to separate the suspension from reaction unit a), comprising the calcium sulfate from step a), as solid from the liquid phase, and the separating unit comprises at least an outlet for the substantially solids-containing phase and an outlet for the substantially liquid-containing phase, where said separating unit is fluidically connected to said reaction unit from step a),
    c) a purifying unit, which is fluidically connected to the first separating unit b) and possesses at least a feed for an acid, where the purifying unit is configured to convert the calcium sulfate separated off in b) and/or calcium sulfate/phosphogypsum from a stockpile into a suspension with the acid supplied to the purifying unit, where the suspension comprises at least calcium sulfate and a $P_2O_5$-containing acid solution and the purifying unit further possesses an outlet line for the suspension,
    d) a second separating unit, configured for treating the suspension from c), where the second separating unit possesses at least an outlet for the $P_2O_5$-containing acid solution and at least an outlet for solid calcium sulfate, where the second separating unit is arranged downstream of said purifying unit, and
    e) e1) at least one fluidic connection configured for returning the $P_2O_5$-containing acid solution from the second separating unit from d) upstream of said reaction unit from step a) or is provided into the reaction unit from step a), and/or
        e2) at least one fluidic connection, starting from the second separating unit from d), and is provided to a section upstream of the second separating unit from step d) and downstream of the first separating unit from step b).

The invention relates further to a plant for producing sulfuric acid and cement clinker using calcium sulfate which is formed and separated off as a solid byproduct in phosphoric acid production, in the reaction of raw phosphate with sulfuric acid to form phosphoric acid, where the plant comprises the following devices:

a) a reaction unit which possesses at least
        i. a raw phosphate feed and
        ii. at least a concentrated sulfuric acid feed line, where said reaction unit is configured to form a suspension at least comprising phosphoric acid and calcium sulfate, where the calcium sulfate is present in the form of dihydrate, hemihydrate or a combination of hemihydrate and dihydrate, and the reaction unit comprises an outlet for said suspension,
    b) a first separating unit, which is configured to separate the suspension from step reaction unit a), comprising the calcium sulfate from step a), as solid from the liquid phase, and the separating unit comprises at least an outlet for the substantially solids-containing phase and an outlet for the substantially liquid-containing phase, where said separating unit is fluidically connected to said reaction unit from step a),
    c) a purifying unit, which is fluidically connected to the first separating unit from step b) and possesses at least a feed for an acid, where the purifying unit is configured to convert the calcium sulfate separated off in step b) and/or calcium sulfate/phosphogypsum from a stockpile into a suspension with the acid supplied to the purifying unit, where the suspension comprises at least calcium sulfate and a $P_2O_5$-containing acid solution and the purifying unit further possesses an outlet line for the suspension,
    d) a further second separating unit, configured for treating the suspension from step c), where the further second separating unit possesses at least an outlet for the $P_2O_5$-containing acid solution and at least an outlet for solid calcium sulfate, where the further second separating unit is arranged downstream of said purifying unit, and
    e) a raw meal mixing unit suitable for mixing therein the separated purified calcium sulfate with admixtures and reducing agent, to give a raw meal mixture for cement clinker production,
    f) a cement clinker process unit, more particularly a combination of a preheater, at least one burner device and a cooler which are suitable for preheating, burning and cooling the raw meal mixture to give the cement clinker, with sulfur dioxide being formed as offgas, and/or g) a sulfuric acid production plant which is supplied as raw material with the sulfur dioxide offgas formed in the cement clinker process unit and optionally purified, to produce sulfuric acid, where the sulfuric acid production plant may be a part of the phosphoric acid production plant or may be an external sulfuric acid production plant.

In one preferred embodiment the above plant further comprises e1) at least a fluidic connection configured for returning the $P_2O_5$-containing acid solution from the further second separating unit from d) upstream of the reaction unit, and/or e2) at least one further fluidic connection starting from the further second separating unit from step d) is provided upstream of the further second separating unit from step d) and downstream of the first separating unit from step b).

The plants may be used for the processes of the invention described above. For information regarding the individual devices and units, reference is made to the information above in relation to them. The above information for the process or processes is valid correspondingly for the plant (s). The processes of the invention as set out above and in the claims are preferably carried out in plants set out in the present description and in the claims.

In accordance with the processes and plants of the invention, a reaction unit, such as a raw phosphate reaction unit, for example, is understood to be a reaction unit which possesses a digestion unit and a crystal formation unit. The two units may be included either separately or in one apparatus—a container, for example.

With the plants of the invention, it is preferable for the second separating unit or calcium sulfate separating unit to be connected fluidically, via a conduit, for example, to the reaction unit of an existing and/or a new phosphoric acid production plant or to a reaction unit of the process of the invention (after step a)), so that the liquid phase obtained in the calcium sulfate separating unit can be introduced as a feedstock into the phosphoric acid production.

With the plant of the invention it is preferable for the calcium sulfate separated off for step c) to be able to be supplied from a separating unit of an existing phosphoric acid production or from the separating unit of the process for phosphoric acid production after step b), which separates the phosphoric acid from the calcium sulfate, or from a calcium sulfate stockpile from phosphoric acid production.

In one embodiment of the plant of the invention, the $P_2O_5$-containing acid solution separated off is supplied to a purification unit after step c). In this case the plant may possess a second calcium sulfate reaction unit (16) which is configured to treat calcium sulfate/phosphogypsum from a stockpile with the $P_2O_5$-containing acid solution from step d) and/or with a $P_2O_5$-containing acid solution from an additional second separating unit or additional calcium sulfate separating unit (6') and to convert it into a suspension of at least calcium sulfate and the $P_2O_5$-containing acid solution. In this case said second calcium sulfate reaction unit (16) possesses an outlet for said suspension.

In a further embodiment of the plant of the invention, this plant possesses a second separating unit or calcium sulfate separating unit (6') which is configured specifically for the treatment of said suspension formed from the calcium sulfate/phosphogypsum from the stockpile. This second separating unit or calcium sulfate separating unit (6') may be present as a parallel second separating unit or calcium sulfate separating unit to a second separating unit after step d). This second separating unit (6') possesses at least one feed line for said suspension from the second calcium sulfate reaction unit (16), at least one outlet for calcium sulfate separated off, and at least one outlet for the $P_2O_5$-containing acid solution separated off. This embodiment of the plant of the invention optionally further provides a fluidic connection of the at least one outlet of the $P_2O_5$-containing acid solution from said second separating unit (6') to a reaction unit of a phosphoric acid plant after step a) or upstream of said reaction unit of a phosphoric acid plant. This may be an existing or a new phosphoric acid plant. This embodiment of the plant of the invention optionally further provides a fluidic connection for the $P_2O_5$-containing acid solution emerging from the second separating unit or calcium sulfate separating unit (6') to a purification unit after step c) or calcium sulfate reaction unit (5).

In a further embodiment of the plant of the invention, as well as the at least one feed line for concentrated sulfuric acid in step a), there is optionally at least one feed line for concentrated sulfuric acid to the purification unit after step c) or calcium sulfate reaction unit, and/or at least one feed line for concentrated sulfuric acid to a second calcium sulfate reaction unit (16), configured for the treatment of calcium sulfate/phosphogypsum from a stockpile, preferably a phosphoric acid production stockpile.

In a further embodiment of the plant of the invention, individual or a plurality of the stated fluidic connections may alternatively be coupled directly with said units of apparatus, or else, insofar as is technologically rational and possible, may be coupled, upstream or downstream of said units of apparatus, to existing material streams, in order to supply media to the units of apparatus through the fluidic connections.

FIG. 1 shows a flow diagram for the workup of calcium sulfate from phosphoric acid production by the process of the invention. Calcium sulfate sludge 14 from the raw phosphate reaction unit of the phosphoric acid plant is passed into the first separating unit, preferably filtration unit, 3 of the phosphoric acid plant, where the calcium sulfate generated in the raw phosphate reaction unit is separated off from the phosphoric acid. The calcium sulfate separated off is conducted into the purification unit 5, where the calcium sulfate is treated with acid. In this process the impurities in the calcium sulfate which adversely affect a downstream clinker process and the cement quality are reduced to the level required by the clinker process. This is an integrated process, in which the process parameters, such as dwell time, acid, temperature and S/L ratio, can be adapted in tune with the starting material qualities and with the desired properties for the product obtained, in terms of further processing. In a second separating unit (calcium sulfate separating unit) 6, which is preferably a filtration unit, the liquid and the resulting solid in the suspension obtained in step c) are separated from one another. The liquid 15, more particularly as filtrate, can be used in the existing phosphoric acid-sulfuric acid complex. The treated calcium sulfate can be processed further in a clinker process.

Figure 2:
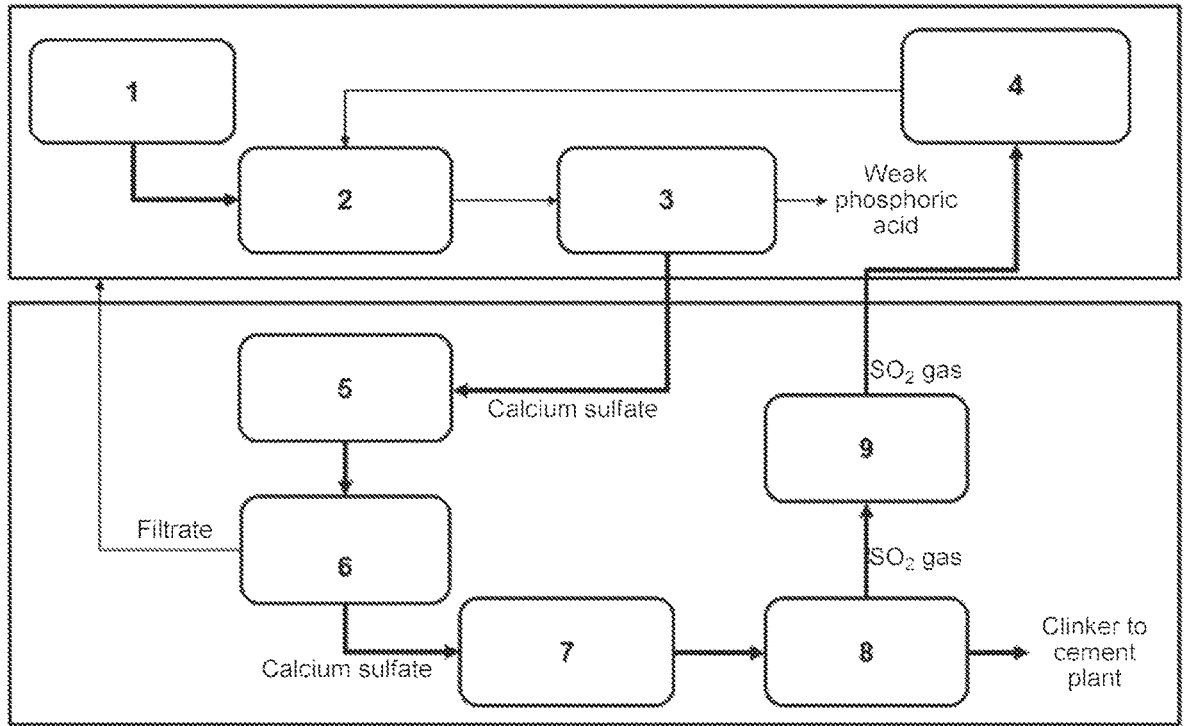
FIG. 2 is a schematic flow diagram for utilizing calcium sulfate from phosphoric acid production by means of an integrated complex for producing cement clinker and sulfuric acid.

FIG. 2 shows a flow diagram of phosphoric acid production (existing complex) and an integrated process for producing cement clinker and sulfuric acid from calcium sulfate which comes from the phosphoric acid production (integrated complex). In a processing unit 1 the phosphate rock is processed to give the raw phosphate. In the raw phosphate reaction unit of the phosphoric acid plant 2, the raw phosphate is reacted with sulfuric acid which comes from the sulfuric acid production plant, to form phosphoric acid and solid calcium sulfate as a byproduct. The calcium sulfate generated in phosphoric acid production is separated from the phosphoric acid in the first separating unit 3, which is preferably a filtration unit, of the phosphoric acid plant, and is supplied to the purification unit 5. There the calcium sulfate is admixed with acid, to give for example a 1-12 molar acid, more particularly a 1-12 molar sulfuric acid, after the treatment. For example a 1-12 molar sulfuric acid may be added for the treatment. Following addition of the acid, the treatment may be carried out for example at a temperature of 15-100° C. for 5 to 120 min, during which the resulting suspension is preferably agitated, by stirring, for example. In this procedure, the impurities in the calcium sulfate that adversely affect the downstream cement clinker process and the cement quality are reduced to the level required by the cement clinker process. In a second separating unit 6, which is preferably a filtration unit, the liquid and the resulting solid are separated from one another. The liquid, more particularly as filtrate, can be used in the existing phosphoric acid-sulfuric acid complex. The treated calcium sulfate is supplied to the raw meal mixing unit 7 positioned upstream for the cement clinker process. In this unit the calcium sulfate is mixed with the required admixtures for the required cement clinker quality in the correct ratio. The cement clinker process unit 8 is charged with the prepared cement clinker raw meal, with the raw meal preferably being preheated in a heat exchanger (not shown) before being supplied to the process unit 8. In the cement clinker process unit 8, sulfur dioxide is separated from the calcium sulfate and supplied as offgas from the cement clinker process unit to the sulfur dioxide offgas treatment facility 9. The treated sulfur dioxide gas may optionally be supplied to the existing sulfuric acid production plant 4. Alternatively the treated sulfur dioxide gas may optionally be supplied to a new sulfuric acid production plant (cf. 13 in FIG. 3). The calcium which remains in the cement clinker process unit is reacted with the admixtures to give cement clinker. The burning temperature for cement clinker production may be effected, for example, in the range from 1200° C. to 1600° C. and a burning time of 5 minutes to 60 minutes. The cement clinker produced in this way can be processed further to give cement.

Figure 3:
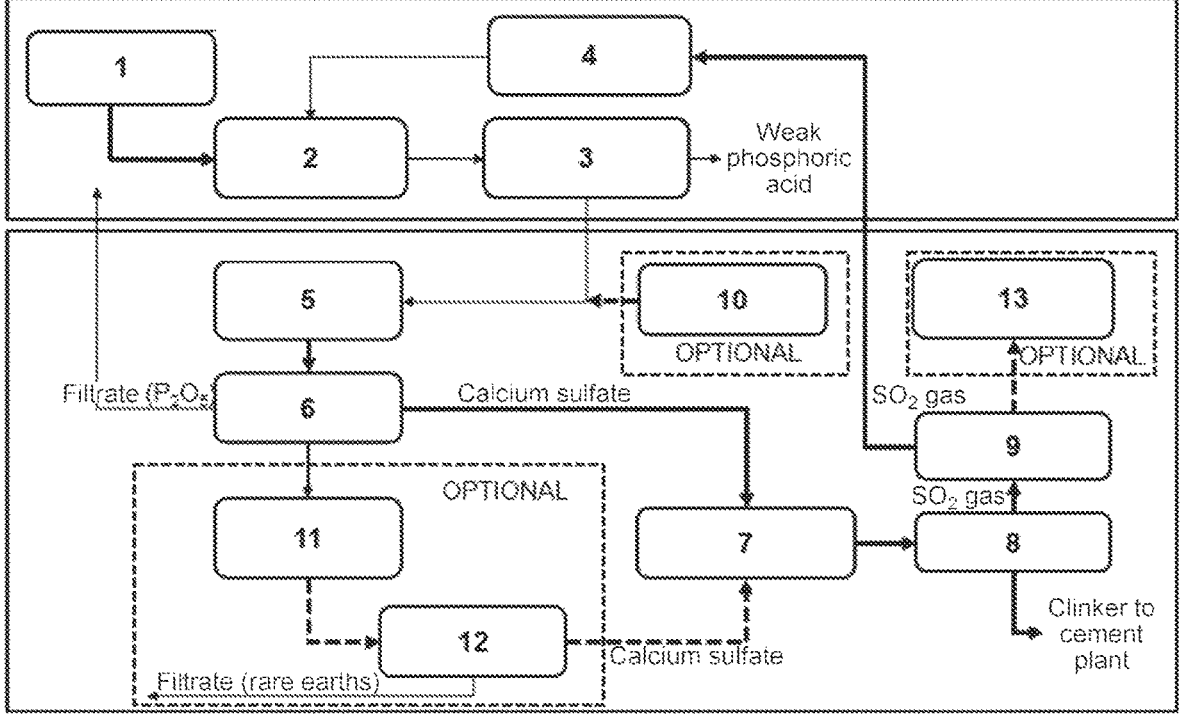
FIG. 3 is a schematic flow diagram for utilizing calcium sulfate from phosphoric acid production by means of an integrated complex for producing cement clinker and sulfuric acid as in FIG. 2, with alternative or additional process steps being shown.

FIG. 3 shows a schematic flow diagram for the utilization of calcium sulfate from phosphoric acid production by means of an integrated complex for producing cement clinker and sulfuric acid according to FIG. 2, with alternative or additional process steps being additionally shown. The text below addresses the alternative or additional process steps; otherwise, reference is made to the explanations given for FIG. 2. FIG. 3 shows an alternative source of the calcium sulfate used in step c). Instead of the calcium sulfate from the filtration unit of the phosphoric acid plant 3, the calcium sulfate used in step c) may be a calcium sulfate from a stockpile 10, which is deposited calcium sulfate from phosphoric acid production. FIG. 3 also shows the optional processing step for the removal of rare earths, comprising a reaction unit for recovering rare earth metals from the calcium sulfate 11, and the calcium sulfate separating unit 12 for separating the liquid phase from the purified calcium sulfate. Also shown in FIG. 3 is that the sulfur dioxide obtained from the SO₂ treatment 9 can be used for the recovery of sulfuric acid in the existing sulfuric acid production plant 4 and/or in a new sulfuric acid production plant 13.

Figure 4:
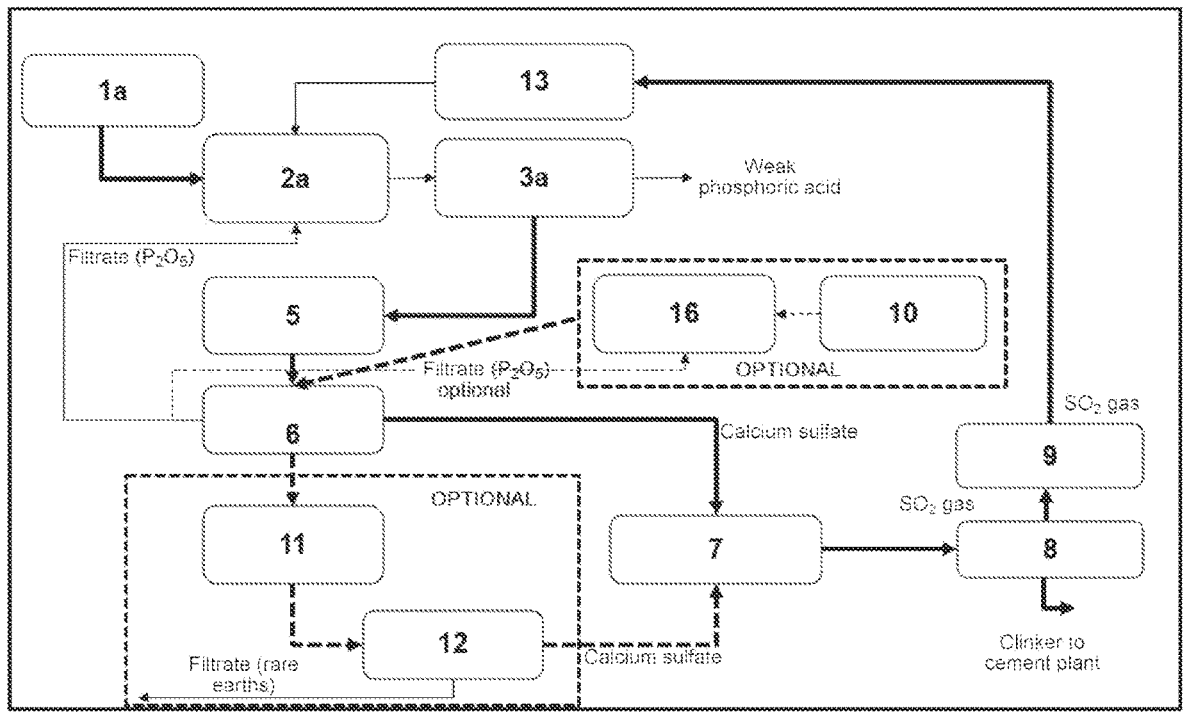
FIG. 4 is a schematic flow diagram of a new integrative overall complex for producing phosphoric acid, calcium sulfate suitable for cement clinker, cement clinker, and sulfuric acid by one example process of the present disclosure, with alternative or additional process steps being shown.

FIG. 4 shows a schematic flow diagram of a total plant for phosphoric acid production, and a process for producing cement clinker and sulfuric acid from calcium sulfate which comes from phosphoric acid production. In this variant of the flow diagram, in contrast to the approaches from FIG. 2 and FIG. 3, a new overall complex is described, rather than integration into existing complexes. In a phosphate rock processing unit 1a, the phosphate rock is processed to give the raw phosphate. In the raw phosphate reaction unit of the phosphoric acid plant 2a, the raw phosphate is reacted with sulfuric acid coming from the sulfuric acid production plant 13, to form phosphoric acid and solid calcium sulfate as a byproduct, where the calcium sulfate byproduct according to processes of the invention may take the form, without preference, of dihydrate, hemihydrate or a combination of hemihydrate and dihydrate. The calcium sulfate generated in phosphoric acid production is separated off from the phosphoric acid in the first separating unit 3a, which is preferably a filtration unit, of the phosphoric acid plant, and is supplied to the purification unit 5. There the calcium sulfate, as already described in FIG. 2, is treated with acid and the resulting suspension is separated into liquid and solid in a second separating unit 6. The liquid, more particularly as filtrate, can be used in the existing phosphoric acid-sulfuric acid complex and/or optionally in a second calcium sulfate reaction unit 16 for the treatment of calcium sulfate from the stockpile 10, in which case the reaction conditions of the second calcium sulfate reaction unit 16 are within the parameter ranges of the purification unit 5. The suspension treated in the second calcium sulfate reaction unit 16, with calcium sulfate from the stockpile, is subsequently supplied to the second separating unit 6, and the subsequent procedure is as described in FIG. 2. As described in FIG. 3, optionally, a further purification step may take place for the recovery of rare earth metals 11 and subsequent separation of the calcium sulfate by way of a calcium sulfate separating unit 12. The treated calcium sulfate is then treated further as described in FIG. 2 in a raw meal mixing unit 7, supplied subsequently to the cement clinker process unit 8, and the sulfur dioxide obtained from the SO₂ treatment 9 is used for the recovery of sulfuric acid in a new sulfuric acid production plant 13. The suspension in the optional calcium sulfate reaction unit 16 may also be transferred for separation not into the second separating unit 6 but instead into a separate calcium sulfate separating unit (not shown), and the calcium sulfate separated off may then be supplied to the raw meal mixing unit 7 and/or to the optional unit for the recovery of rare earths from calcium sulfate 11.

Figure 5:
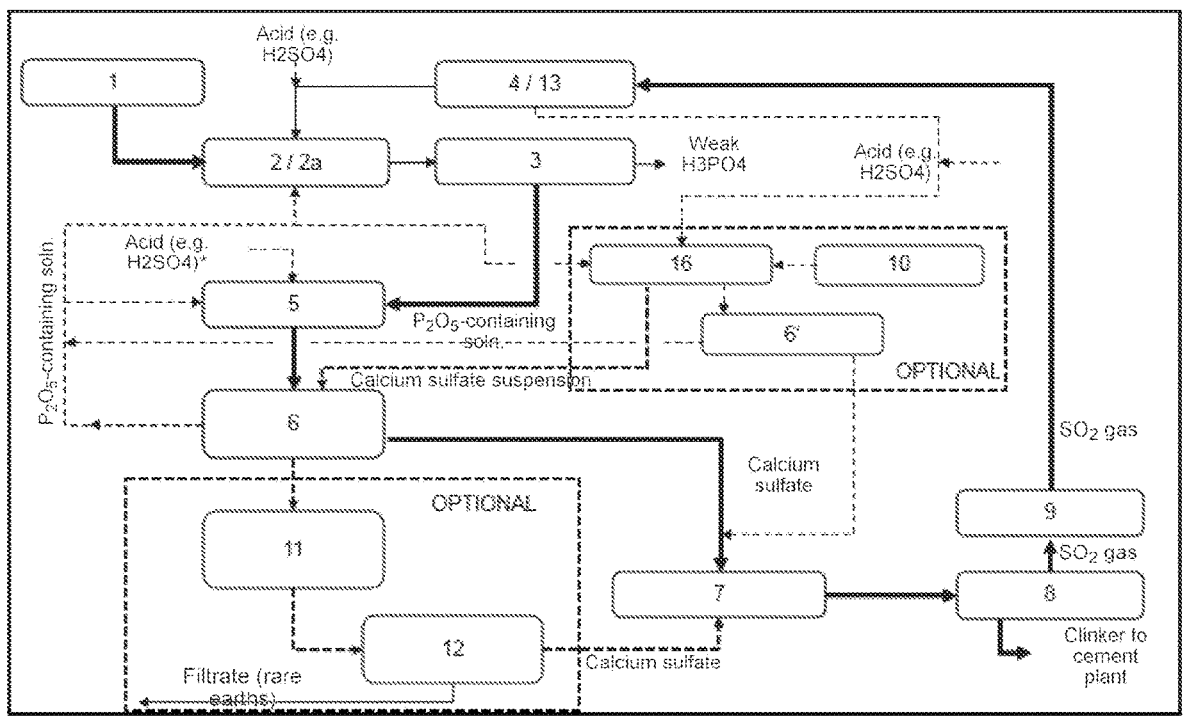
FIG. 5 is a schematic flow diagram of a new integrative overall complex for producing phosphoric acid, calcium sulfate suitable for cement clinker, cement clinker, and sulfuric acid by still another example process of the present disclosure, with various embodiments of the concept of the present disclosure being additionally shown, which may be present individually or cumulatively.

FIG. 5 shows an extended representation of FIGS. 2 to 4. The explanations made so far for FIGS. 2 to 4 are valid here correspondingly. Additionally represented are the feed lines for the acid, preferably sulfuric acid, and in accordance with the concept of the invention a circuit is made by the feed of sulfuric acid from a sulfuric acid production plant 4 and/or 13 to a reaction unit in a phosphoric acid plant 2 and/or 2a. It is possible for the sulfuric acid plants 4 and 13 to coexist. It is likewise possible for the phosphoric acid plants 2 and 2a to coexist. An acid, preferably a sulfuric acid, may additionally be introduced from an external source into the process. The sulfuric acid produced in the sulfuric acid plant 4 and/or 13 may be introduced into the second calcium sulfate reaction unit 16. Here as well, alternatively, an acid, preferably a sulfuric acid, from an external source can be utilized for supplying the second calcium sulfate reaction unit 16 with an acid. The sulfuric acid from 4 and/or 13 may likewise be introduced into the purification unit or calcium sulfate reaction unit 5. For the sake of clarity, this fluidic connection is not represented by a direct arrow in FIG. 5, but the asterisk (*) is intended to make it clear. For treating the calcium sulfate/phosphogypsum from a stockpile, preferably a phosphoric acid plant stockpile, the suspension obtained, which originates from the uniting of the acid from, for example, 4 and/or 13 with the calcium sulfate/phosphogypsum of the stockpile 10 within the second calcium sulfate reaction unit 16, can be transferred into an additional second separating unit or calcium sulfate separating unit 6'. Here the suspension is separated into calcium sulfate and a $P_2O_5$-containing acid solution. The calcium sulfate from 6' may therefore optionally be supplied to the raw meal preparation facility 7. The suspension of the second calcium sulfate reaction unit 16 may optionally also be transferred into the second separating unit or calcium sulfate separating unit 6. The $P_2O_5$-containing acid solution as is obtained in the second separating unit or calcium sulfate separating unit 6 and/or in the additional second separating unit or calcium sulfate separating unit 6' may be returned to the purification unit or calcium sulfate reaction unit 5 and/or the reaction unit of the phosphoric acid plant 2 and/or 2a, and/or optionally to the second calcium sulfate reaction unit 16. The dashed lines/arrows, accordingly, represent material streams which are present optionally, which may be present individually or else simultaneously.

EXAMPLES

Set out below are a number of examples relating to the purification of various phosphogypsums. The phosphogypsums were each dried before and after treatment by described methods for at least 24 h at 50° C. to remove free water. Before and after treatment, the chemical composition of the gypsums was determined using x-ray fluorescence analysis (XFA) on an Axios Advanced spectrometer from PANalytical with the software package SuperQ 5.3B. For the purpose of analysis the gypsum was digested using lithium tetraborate. The loss on ignition of the gypsums was ascertained at 1050° C. The fluoride content was determined following digestion of the gypsum with sodium peroxide and hydrochloric acid, by means of an ion-selective electrode. All of the values reported below for the results from the XFA pertain to the gypsum samples free from loss on ignition. A number of gypsums were additionally studied for their mineralogical composition, before and after treatment, by powder diffractometry, on a D4 Endeavor diffractometer from Bruker. Evaluation using the Rietveld method took place using the software package Topas 4.2 from Bruker. The $D_v(50)$ value of the grain size distribution was ascertained on a Mastersizer 3000 from Malvern, using ethanol as dispersing medium. The scattering model employed was the Fraunhofer model.

Example 1

50 g of a phosphogypsum designated as "PG A" with $P_2O_5$ contents of 1.29 wt % and F contents of 1.25 wt % was stirred using a KPG stirrer with 200 ml (S/L=0.25) of 8-molar sulfuric acid for 30 minutes at 60° C. After this time had elapsed, the suspension was rapidly filtered and washed twice with 57.5 ml of water at room temperature. After treatment, the $P_2O_5$ and F contents are 0.02 and 0.01 wt %, respectively (corresponding to a leaching efficiency of 98% and 99%, respectively). The mineralogical composition before treatment was found to be 2.8 wt % quartz, 91.5 wt % dihydrate ($CaSO_4*2H_2O$), 3.7 wt % hemihydrate ($CaSO_4*0.5$ $H_2O$) and 2.9 wt % anhydrite ($CaSO_4$). Following treatment, the composition found was as follows: 3.3 wt % quartz, 1.2 wt % dihydrate ($CaSO_4*2H_2O$), 0.1 wt % hemihydrate ($CaSO_4*0.5$ $H_2O$) and 95.5 wt % anhydrite ($CaSO_4$).

Example 2

75 g of the same gypsum PG A as in example 1 was stirred in a further experiment using a KPG stirrer with 150 ml (S/L=0.5) of 6-molar sulfuric acid for 30 minutes at 60° C. After the time had elapsed, the suspension was rapidly filtered and washed twice with 86.3 ml of water at room temperature. Following treatment, the $P_2O_5$ and F contents are 0.29 and 0.03 wt %, respectively (corresponding to a leaching efficiency of 78% and 98%, respectively). The mineralogical composition found after treatment was as follows: 3.2 wt % quartz, 73.2 wt % dihydrate ($CaSO_4*2H_2O$), 2.4 wt % hemihydrate ($CaSO_4*0.5$ $H_2O$) and 21.2 wt % anhydrite ($CaSO_4$). The $D_v(50)$ after treatment is 59.1 µm.

Example 3

75 g of a further gypsum (designated as PG B) having $P_2O_5$ contents of 1.70 wt % and F contents of 2.13 wt % was stirred in a further experiment using a KPG stirrer with 150 ml (S/L=0.5) of 6-molar sulfuric acid for 30 minutes at 75° C. After the time had elapsed, the suspension was rapidly filtered and washed twice with 86.3 ml of water at room temperature. Following treatment, the $P_2O_5$ and F contents are 0.07 and 0.12 wt %, respectively (corresponding to a leaching efficiency of 96% and 94%, respectively). The mineralogical composition before treatment was found to be 3 wt % quartz and 97 wt % dihydrate ($CaSO_4*2H_2O$). After treatment, the composition found was as follows: 2.5 wt % quartz, 0.4 wt % dihydrate ($CaSO_4*2H_2O$) and 97.2 wt % anhydrite ($CaSO_4$). The $D_v(50)$ after treatment is 9.77 µm.

Example 4

75 g of the same gypsum (PG B) was stirred in a further experiment using a KPG stirrer with 150 ml (S/L=0.5) of 6-molar sulfuric acid for 45 minutes at 75° C. After the time had elapsed, the suspension was rapidly filtered and washed twice with 86.3 ml of water at 75° C. temperature. Following treatment, the $P_2O_5$ and F contents are 0.03 and 0.11 wt %, respectively (corresponding to a leaching efficiency of 98/and 95%, respectively). The mineralogical composition found after treatment was as follows: 2.9 wt % quartz, 0.2 wt % dihydrate ($CaSO_4*2H_2O$) and 97.0 wt % anhydrite ($CaSO_4$). The $D_v(50)$ after treatment is 9.34 µm.

Example 5

75 g of the same gypsum (PG B) was stirred in a further experiment using a KPG stirrer with 150 ml (S/L=0.5) of 7-molar sulfuric acid for 30 minutes at 75° C. After the time had elapsed, the suspension was rapidly filtered and washed twice with 86.3 ml of water at room temperature. Following treatment, the $P_2O_5$ and F contents are 0.03 and 0.06 wt %, respectively (corresponding to a leaching efficiency of 98% and 97%, respectively). The $D_v(50)$ after treatment is 6.99 µm.

Example 6

75 g of the same gypsum (PG B) was stirred in a further experiment using a KPG stirrer with 150 ml (S/L=0.5) of 4-molar sulfuric acid for 20 minutes at 30° C. After the time had elapsed, the suspension was rapidly filtered and washed twice with 86.3 ml of water at room temperature. Following treatment, the $P_2O_5$ and F contents are 0.43 and 0.17 wt %, respectively (corresponding to a leaching efficiency of 75/o and 92%, respectively). The mineralogical composition found after treatment was as follows: 1.7 wt % quartz, 96.3 wt % dihydrate ($CaSO_4*2H_2O$), 2.0 wt % hemihydrate ($CaSO_4*0.5\ H_2O$) and 0 wt % anhydrite ($CaSO_4$). The $D_x(50)$ after treatment is 16.1 µm.

Example 7

In order to adjudge whether the process described can also be used with merely separated and hence unwashed phosphogypsum from the phosphoric acid plant, 75 g of the same gypsum PG B as in example 3 were admixed with 25 g of 25% strength $P_2O_5$ solution (in the form of phosphoric acid) and stirred using a KPG stirrer with 150 ml (S/L=0.5; 25 g of $P_2O_5$ solution disregarded) of 7-molar sulfuric acid for 30 minutes at 75° C. After the time had elapsed, the suspension was rapidly filtered and washed twice with 86.3 ml of water at room temperature. After treatment, the $P_2O_5$ and F contents are 0.07 and 0.08 wt %, respectively (corresponding to a leaching efficiency of 96% and 96%, respectively). Following treatment, the mineralogical composition found was as follows: 2.5 wt % quartz, 0.2 wt % dihydrate ($CaSO_4*2H_2O$) and 97.3 wt % anhydrite ($CaSO_4$). The $D_x(50)$ after treatment is 6.62 µm.

Example 8

In order to evaluate the filterability of the suspensions in dependence on the influencing variables such as, for example, temperature, dwell time and acid concentration, the filtration times of the suspensions from examples 3, 4 and 5 on a suction filter with a filter area of 56 cm² were determined at a reduced pressure of 500 mbar. In all cases the height of the filtercake was between 13 and 14.5 mm. In the case of the suspension from example 5, the resulting filtration times were 30 s and 52 s and also 39 s in washes 1 and 2, respectively. In the case of the suspension from example 3, the resulting filtration times were 11 s and 22 s and also 19 s in washes 1 and 2, respectively. In the case of the suspension from example 4, the resulting filtration times were 11 s and 20 s and also 11 s in washes 1 and 2, respectively. It is apparent that the filterability can be optimized by adaptation of the influencing variables, with retention of the quality of purification.

Example 9

In order to look at the feasibility of integrating process analysis via determination of the acid concentration, 150 g of the gypsum PG B was stirred in a further experiment using a KPG stirrer with 300 ml (S/L=0.5) of 5-molar sulfuric acid at 75° C. After defined time intervals each of 10 minutes and directly after the start (t=1 minute), a sample (around 12 ml of suspension) was taken in each case, with filtration, and was washed twice with around 6 ml of water each time. The filtrate of the first filtration step was collected and used for further analyses. The reaction was terminated after 100 minutes, meaning that a total of 11 samples were taken. To determine the acid concentration of the individual filtrate samples, 0.5 ml of each filtrate was diluted with around 20-40 ml of ultrapure water and titrated using 1 M sodium hydroxide solution. Additionally the concentration of the acid used was also studied. The equivalence point was determined potentiometrically using a commercial automatic titrator from Metrohm. The filtered and washed phosphogypsum samples were dried at 50° C. for at least 24 h and then analyzed for mineralogy and $P_2O_5$ content.

TABLE 1

Resulting acid concentration after corresponding dwell time of gypsum PG B in sulfuric acid; with the reaction conditions: c = 5 mol/l; T = 75° C.; S/L = 0.5. The concentration of the acid used was likewise studied.

| Sample | Sampling time min. | Acid concentration, sample mol/l Mean | Relative decrease in acid concentration, sample % |
|---|---|---|---|
| 5M $H_2SO_4$ (used) | | 4.97 | — [i] |
| E0 | 1 | 5.01 | 0% [ii] |
| E1 | 10.33 | 4.92 | 1.9% |
| E2 | 20 | 4.82 | 3.9% |
| E3 | 30 | 4.77 | 5.0% |
| E4 | 40 | 4.67 | 6.9% |
| E5 | 50 | 4.57 | 8.9% |
| E6 | 60 | 4.60 | 8.4% |
| E7 | 70 | 4.61 | 8.0% |
| E8 | 80 | 4.64 | 7.6% |
| E9 | 90 | 4.67 | 7.0% |
| E10 | 100 | 4.68 | 6.7% |

Figure 6:
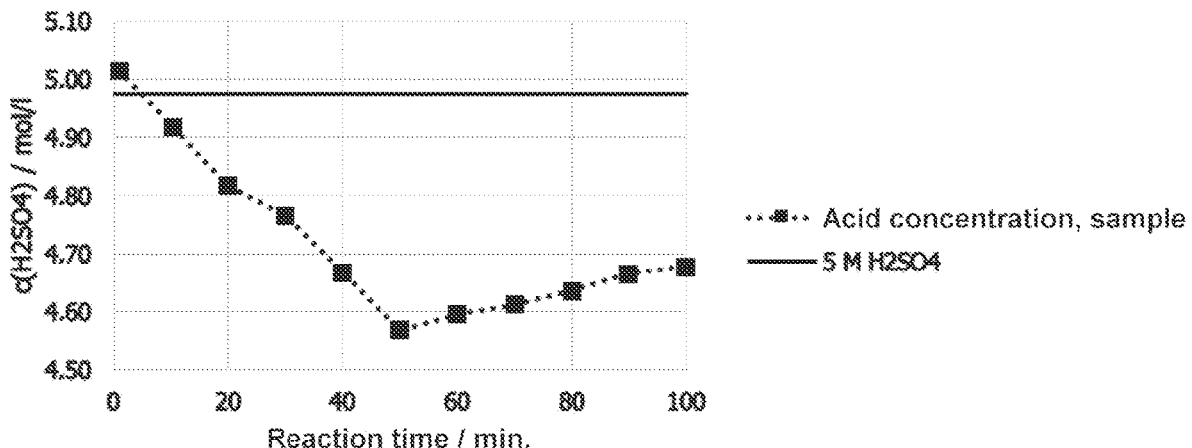
FIG. 6 is a graphic representation of acid concentration against dwell time of a gypsum of the gypsum PG B in sulfuric acid from example 9.

[i] acid used; control measurement
[ii] acid concentration measured after one minute; defined as starting concentration after direct addition of the acid FIG. 6 is a graphical representation of the acid concentration against the dwell time of the gypsum of the gypsum PG B in sulfuric acid.

TABLE 2

Mineralogy and leaching efficiency with respect to $P_2O_5$ content after corresponding dwell time of the gypsum PG B in sulfuric acid; with the reaction conditions: c = 5 mol/l; T = 75° C.; S/L = 0.5.

| Sample | Sampling min. | Anhydrite wt % | Dihydrate wt % | Hemihydrate wt % | $P_2O_5$ (Lol-free) wt % 1.70 | $P_2O_5$ leaching % |
|---|---|---|---|---|---|---|
| E0 | 1 | 18.7 | 74.9 | 4.4 | 0.46 | 72.8 |
| E1 | 10.33 | 34.0 | 59.4 | 3.4 | 0.42 | 75.2 |
| E2 | 20 | 35.4 | 58.6 | 3.4 | 0.33 | 80.6 |
| E3 | 30 | 40.1 | 54.6 | 2.6 | 0.27 | 84.4 |
| E4 | 40 | 79.4 | 17.3 | 0.7 | 0.18 | 89.7 |
| E5 | 50 | 96.9 | 0.2 | 0.0 | 0.11 | 93.7 |
| E6 | 60 | 97.2 | 0.0 | 0.0 | 0.06 | 96.2 |
| E7 | 70 | 97.3 | 0.0 | 0.0 | 0.05 | 96.8 |
| E8 | 80 | 95.1 | 0.7 | 0.0 | 0.04 | 97.5 |
| E9 | 90 | 96.4 | 0.3 | 0.0 | 0.05 | 96.8 |
| E10 | 100 | 97.3 | 0.0 | 0.0 | 0.03 | 98.1 |

Figure 7:
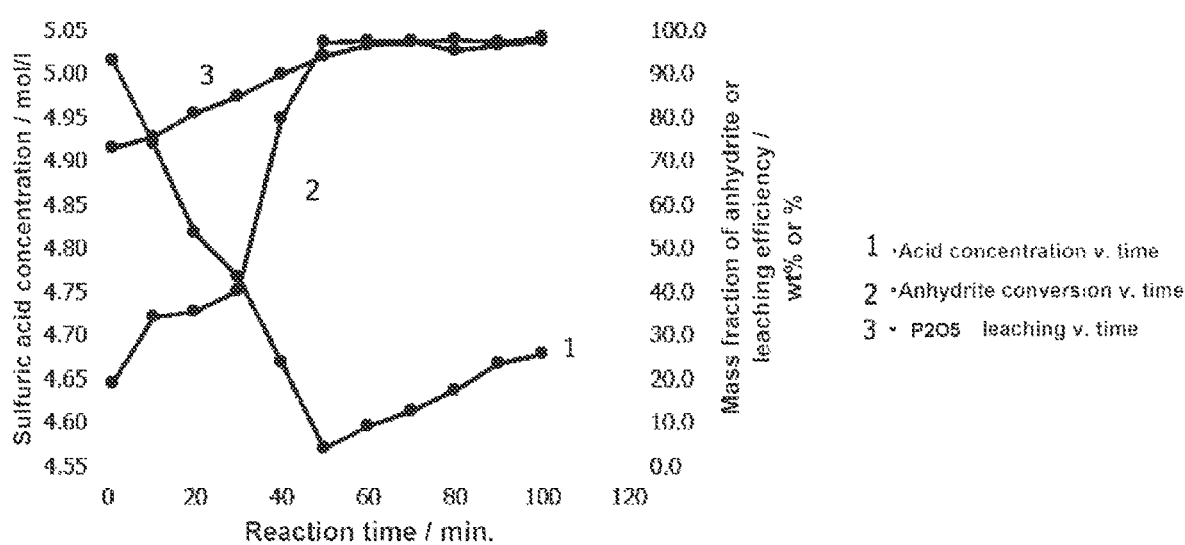
FIG. 7 is a graphic representation of acid concentration (left-hand axis), anhydrite content (right-hand axis), and leaching efficiency with respect to $P_2O_5$ content (right-hand axis) against dwell time of the gypsum PG B in sulfuric acid from example 9.

FIG. 7 is a graphical representation of the acid concentration (left-hand axis), of the anhydrite content (right-hand axis) and of the leaching efficiency with respect to $P_2O_5$ content (right-hand axis) against the dwell time of the gypsum PG B in sulfuric acid.

Example 10

For the same purpose as in example 9, 150 g of the gypsum PG A was stirred in a further experiment using a KPG stirrer with 300 ml (S/L=0.5) of 6-molar sulfuric acid at 75° C. After defined time intervals each of around 6 minutes and directly after the start (t=0.5 minutes), a sample (around 12 ml of suspension) was taken in each case, with filtration, and was washed twice with around 6 ml of water each time. The filtrate of the first filtration step was collected and used for further analyses. The reaction was terminated after 55 minutes, meaning that a total of 9 samples were taken. To determine the acid concentration of the individual filtrate samples, 0.5 ml of each filtrate was diluted with around 20-40 ml of ultrapure water and titrated using 1 M sodium hydroxide solution. Additionally the concentration of the acid used was also studied. The equivalence point was determined potentiometrically using a commercial automatic titrator from Metrohm. The filtered and washed phosphogypsum samples were dried at 50° C. for at least 24 h and then analyzed for mineralogy and $P_2O_5$ content.

TABLE 3

Resulting acid concentration after corresponding dwell time of gypsum PG A in sulfuric acid; with the reaction conditions: c = 6 mol/l; T = 75° C.; S/L = 0.5. The concentration of the acid used was likewise studied.

| Sample | Sampling min. | Acid concentration, sample mol/l Mean | Relative decrease in acid concentration, sample % |
|---|---|---|---|
| 6M H₂SO₄ (used) | | 6.076 | — [i] |
| E0 | 0.5 | 6.102 | 0% [ii] |
| E1 | 6 | 5.946 | 2.6% |
| E2 | 12 | 5.662 | 7.2% |
| E3 | 17.5 | 5.599 | 8.2% |
| E4 | 23 | 5.622 | 7.9% |
| E5 | 28.5 | 5.630 | 7.7% |
| E6 | 34.5 | 5.665 | 7.2% |
| E7 | 45 | 5.656 | 7.3% |
| E8 | 55 | 5.699 | 6.6% |

Figure 8:
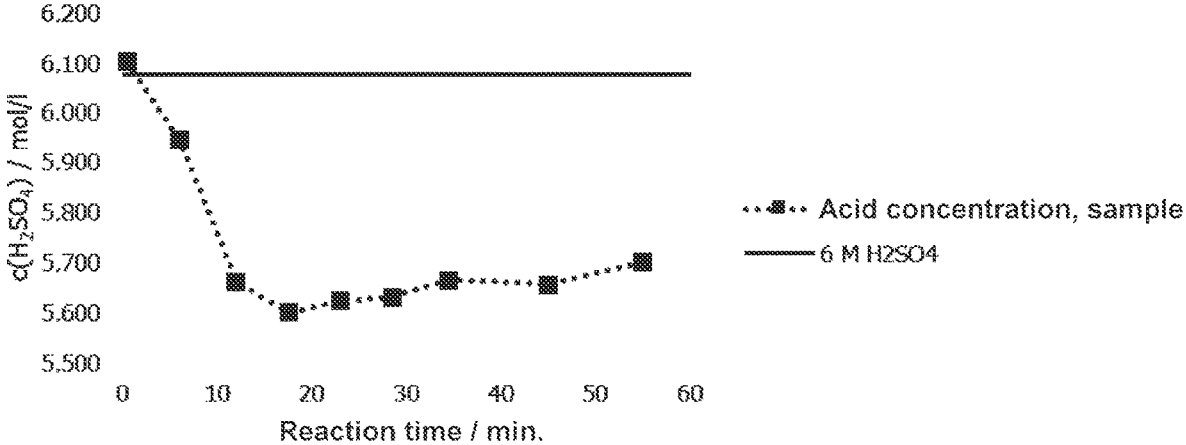
FIG. 8 is a graphic representation of acid concentration against dwell time of the gypsum PG A in sulfuric acid from example 10.

[i] acid used; control measurement
[ii] acid concentration measured after half a minute; defined as starting concentration after direct addition of the acid FIG. 8 is a graphical representation of the acid concentration against the dwell time of the gypsum PG A in sulfuric acid.

TABLE 4

Mineralogy and leaching efficiency with respect to $P_2O_5$ content after corresponding dwell time of the gypsum PG A in sulfuric acid; with the reaction conditions: c = 6 mol/l; T = 75° C.; S/L = 0.5.

| Sample | Sampling min. | Anhydrite wt % | Dihydrate wt % | Hemihydrate wt % | P₂O₅ (Lol-free) wt % 0.99 | P₂O₅ leaching % |
|---|---|---|---|---|---|---|
| E0 | 0.5 | 17.9 | 79.9 | 0.0 | 0.55 | 44.9 |
| E1 | 6.0 | 89.4 | 7.9 | 0.0 | 0.32 | 67.8 |
| E2 | 12.0 | 95.1 | 2.1 | 0.0 | 0.11 | 88.9 |
| E3 | 17.5 | 97.6 | 0.0 | 0.0 | 0.05 | 94.5 |
| E4 | 23.0 | 97.7 | 0.0 | 0.0 | 0.06 | 94.4 |
| E5 | 28.5 | 97.5 | 0.0 | 0.0 | 0.04 | 95.6 |
| E6 | 34.5 | 97.6 | 0.0 | 0.0 | 0.04 | 95.6 |
| E7 | 45.0 | 97.4 | 0.0 | 0.0 | 0.04 | 95.6 |
| E8 | 55.0 | 97.7 | 0.0 | 0.0 | 0.04 | 95.6 |

Figure 9:
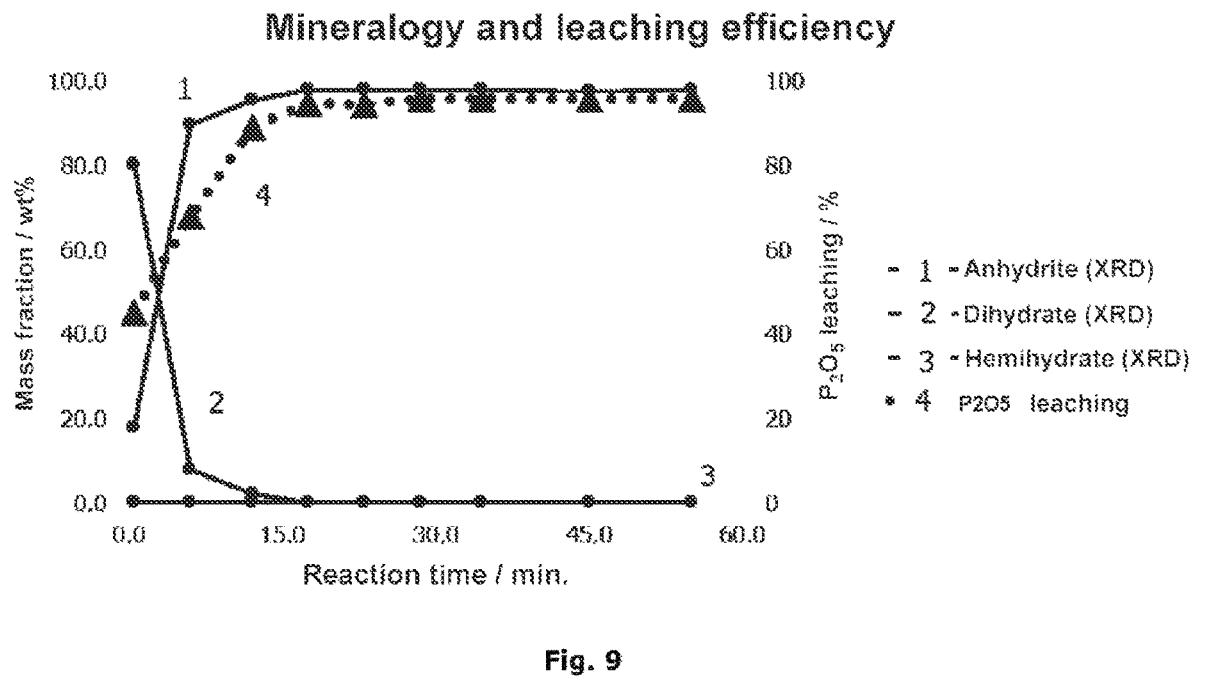

FIG. 9 is a graphical representation of the mineralogical composition (left-hand axis) and of the leaching efficiency with respect to $P_2O_5$ content (right-hand axis) against the dwell time of the gypsum PG A in sulfuric acid.

Example 11

A further example showing the optimization of filterability by monitoring of the reaction course is given below. For this purpose, 150 g of the gypsum PG A to were stirred by means of a KPG stirrer with 150 ml (S/L=0.5) of 5-molar sulfuric acid for in one case 100 minutes at 75° C. and in another case the same amount of gypsum with the same acid concentration, same S/L ratio and same temperature but only for 40 minutes (optimum ascertained in preliminary experiment for minimum acid concentration; similarly to example 9). After the time had elapsed, the suspensions were rapidly filtered and each washed twice with 172.5 ml of water at room temperature. Following treatment, the $P_2O_5$ and F contents for 100 minutes' reaction time are 0.02 and 0.03 wt %, respectively (corresponding to a leaching efficiency of 98% and 98%, respectively) and for 40 minutes are 0.06 and <0.01 wt %, respectively (corresponding to a leaching efficiency of 95% and virtually 100%, respectively). Following treatment, the mineralogical composition ascertained was as follows: (for 100 minutes' reaction time) 5.7 wt % quartz, 0.1 wt % dihydrate ($CaSO_4*2H_2O$), 0.0 wt % hemihydrate ($CaSO_4*0.5 H_2O$) and 94.2 wt % anhydrite ($CaSO_4$). (for 40 minutes' reaction time) 2.3 wt % quartz, 18.3 wt % dihydrate ($CaSO_4*2H_2O$), 0.2 wt % hemihydrate ($CaSO_4*0.5 H_2O$) and 79.3 wt % anhydrite ($CaSO_4$). The $D_v(50)$ after 100 minutes' reaction time is 12.8 µm and after 40 minutes' reaction time is 18.0 µm. In terms of the filtration time there is a significant improvement if the reaction is terminated after just 40 minutes and the suspension is filtered. Using a suction filter and under reduced pressure as described in example 8, the two suspensions were filtered and the filtercakes were washed twice. A distinct difference was already evident from the filtercake heights. After 100 minutes' reaction time, the height was 24 mm, and after 40 minutes' reaction time it was 29 mm. In the case of the suspension after 100 minutes, the filtration time was 27 s and 55 s and also 55 s in washes 1 and 2. In the case of the suspension after 40 minutes, the filtration time was 21 s and 35 s and also 38 s in washes 1 and 2. Adding up the filtration times and washes, the resulting improvement in filterability is around 31% merely by optimizing the end of reaction (40 minutes rather than 100 minutes' reaction time) for virtually the same leaching efficiency.

LIST OF REFERENCE SYMBOLS

1 Processing unit for phosphate rock/phosphate ore
1a Processing unit for phosphate rock/phosphate ore (new)
2 Reaction unit of phosphoric acid plant
2a Reaction unit of phosphoric acid plant (new)
3 First separating unit of phosphoric acid plant, preferably filtration unit
3a First separating unit of phosphoric acid plant (new), preferably filtration unit
4 Sulfuric acid production plant (existing)
5 Purification unit or calcium sulfate reaction unit
6 Second separating unit or calcium sulfate separating unit
7 Raw meal mixing unit
8 Cement clinker process unit
9 Sulfur dioxide offgas treatment
10 Calcium sulfate from stockpile (preferably from phosphoric acid production)
11 Recovery of rare earths from calcium sulfate
12 Calcium sulfate separating unit
13 Sulfuric acid production plant (new)
14 Calcium sulfate sludge from reaction unit of phosphoric acid plant

15 Liquid separated off for the existing sulfuric acid/phosphoric acid complex

16 Second calcium sulfate reaction unit

What is claimed is:

1. A process for producing sulfuric acid and cement clinker, the process comprising:

a) digesting raw phosphate in a first step with concentrated sulfuric acid and converting the raw phosphate to calcium sulfate in a form of dihydrate, hemihydrate, or a combination of hemihydrate and dihydrate, and phosphoric acid;

b) separating off the calcium sulfate as a solid from a liquid phase of a suspension that is obtained;

c) treating the calcium sulfate from step (b), separated off from the phosphoric acid, and/or calcium sulfate/phosphogypsum from a stockpile with an acid to give a suspension with purified calcium sulfate and a $P_2O_5$-containing acid solution;

d) determining a $t_{MIN}$, wherein $t_{MIN}$ is a time at which an acid concentration during the treatment in step (c) is a minimum, and separating off the purified calcium sulfate after step (c) as a solid from a liquid phase of the suspension that is obtained, wherein the separation of the purified calcium sulfate from the suspension is started at a time in a range from $t_{MIN}$+30 minutes to $t_{MIN}$−30 minutes; and e) mixing the purified calcium sulfate that is separated off and obtained in step (d) with admixtures and reducing agent to give a raw meal mixture for cement clinker production;

f) burning the raw meal mixture to give the cement clinker, with sulfur dioxide being formed as an offgas; and g) supplying the sulfur dioxide as raw material to sulfuric acid production to produce the sulfuric acid.

2. The process of claim 1 wherein the separation of the purified calcium sulfate from the suspension in step (d) is started at a time in a range from $t_1$+20 minutes to $t_1$−20 minutes, wherein $t_1$ is a time at which the acid concentration during the treatment in step (c) has been reduced by at least 1.0% of an initial acid concentration.

3. The process of claim 1 wherein the separation of the purified calcium sulfate from the suspension in step (d) is started at a time in a range from $t_{MIN}$+15 minutes to $t_{MIN}$−15 minutes.

4. The process of claim 1 wherein the treatment of the calcium sulfate/phosphogypsum from the stockpile without the calcium sulfate from step (b) is treated in a separate step with an acid and either a suspension that is formed is supplied to step (d), or a suspension that is formed is supplied to a separate separating unit and in the separate separating unit a solid is separated from a liquid phase comprising a $P_2O_5$-containing acid solution.

5. The process of claim 1 wherein the calcium sulfate is separated off from the phosphoric acid in step (b) by filtration.

6. The process of claim 1 wherein the calcium sulfate in step (c) is either:

from the stockpile, or obtained from a separating unit of step (b), wherein calcium sulfate filtercake obtained after a first separation from the phosphoric acid is used directly or after one or more washes with liquid.

7. The process of claim 1 wherein at least one of:

in step (c) the acid is added in an amount such that a weight ratio of solids to liquid in the suspension is in a range from 1/5 to 1/1;

an acid resulting from the treatment in step (c) is a 3 to 10 molar acid;

the acid in step (c) is hydrochloric acid, nitric acid, sulfurous acid, and/or sulfuric acid;

the treatment in step (c) is performed at a temperature in a range from 30 to 80° C.; or a duration of the treatment in step (c) is in a range from 15 to 90 minutes.

8. The process of claim 1 wherein a $D_v$ (50) of a grain size distribution of calcium sulfate anhydrite obtained in step (d) is in a range of 0.5-100 μm.

9. The process of claim 1 wherein the purified calcium sulfate from step (d) accounts for more than 70% by weight of a total calcium sulfate in the raw meal mixture.

10. The process of claim 1 wherein the entire process is performed in a single integrated production plant complex.

\* \* \* \* \*